US012786438B2

(12) United States Patent
Li et al.

(10) Patent No.: US 12,786,438 B2
(45) Date of Patent: Nov. 3, 2026

(54) INTRA TEMPLATE MATCHING PREDICTION CHROMA BLOCK VECTOR DERIVATION FROM LUMA BLOCK VECTORS

(71) Applicant: Tencent America LLC, Palo Alto, CA (US)

(72) Inventors: Guichun Li, San Jose, CA (US); Xin Zhao, Santa Clara, CA (US); Lien-Fei Chen, Hsinchu (TW); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 75 days.

(21) Appl. No.: 17/983,353

(22) Filed: Nov. 8, 2022

(65) Prior Publication Data

US 2024/0022739 A1 Jan. 18, 2024

Related U.S. Application Data

(60) Provisional application No. 63/388,597, filed on Jul. 12, 2022.

(51) Int. Cl.

*H04N 19/186* (2014.01)
*H04N 19/176* (2014.01)
*H04N 19/70* (2014.01)

(52) U.S. Cl.

CPC ......... *H04N 19/186* (2014.11); *H04N 19/176* (2014.11); *H04N 19/70* (2014.11)

(58) Field of Classification Search

CPC .... H04N 19/105; H04N 19/11; H04N 19/176; H04N 19/186; H04N 19/593; H04N 19/70

See application file for complete search history.

(56) References Cited

U.S. PATENT DOCUMENTS

2011/0176614 A1* 7/2011 Sato .................... H04N 19/176 375/E7.243
2012/0170649 A1* 7/2012 Chen .................... H04N 19/122 375/240.18

(Continued)

FOREIGN PATENT DOCUMENTS

KR 10-2021-0000635 A 1/2021

OTHER PUBLICATIONS

Muhammed Coban, et al., Algorithm description of Enhanced Compression Model 5 (ECM 5), Joint Video Experts Team (JVET) of ITU-T SG 16 WP 3 and ISO/IEC JTC 1/SC 29, 26th Meeting, by teleconference, Apr. 20-29, 2022, Document: JVET-Z2025, pp. 1-45.

(Continued)

*Primary Examiner* — Shahan Ur Rahaman
(74) *Attorney, Agent, or Firm* — ARENTFOX SCHIFF LLP

(57) ABSTRACT

Aspects of the disclosure provide methods and apparatuses for video encoding/decoding. In some examples, processing circuitry receives a coded video bitstream including a current picture. The current picture includes a chroma block in a chroma separate tree, the chroma block being collocated in a same luma area with one or more luma blocks. The processing circuitry decodes, from the coded video bitstream, a syntax element that indicates a current picture referencing (CPR) mode for the chroma block, and determines, in response to the CPR mode, a chroma block vector for the chroma block according to one or more luma block vectors associated with the one or more luma blocks. The chroma block vector indicates a reference chroma block in the current picture. The processing circuitry reconstructs the chroma block based on the reference chroma block in the current picture.

19 Claims, 25 Drawing Sheets

(56) References Cited

U.S. PATENT DOCUMENTS

| | | | | |
|---|---|---|---|---|
| 2021/0297673 | A1* | 9/2021 | Zhang | H04N 19/186 |
| 2021/0385439 | A1* | 12/2021 | Zhu | H04N 19/96 |
| 2022/0021890 | A1 | 1/2022 | Poirier et al. | |
| 2024/0259555 | A1* | 8/2024 | Zhang | H04N 19/176 |
| 2026/0006187 | A1* | 1/2026 | Lim | H04N 19/107 |

OTHER PUBLICATIONS

Jianle Chen, et al., Algorithm description for Versatile Video Coding and Test Model 10 (VTM 10), Joint Video Experts Team (JVET) of ITU-T SG 16 WP 3 and ISO/IEC JTC 1/SC 29/WG 11, 19th Meeting: by teleconference, Jun. 22-Jul. 1, 2020, Document: JVET-S2002-v1, pp. 1-97.

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.

ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-664.

International Search Report in PCT/CN2022/079737, mailed on Feb. 22, 2023, 4 pages.

Written Opinion in PCT/CN2022/079737, mailed on Feb. 22, 2023, 4 pages.

Extended European Search Report received for European Application No. 22951347.8, mailed on Jun. 17, 2026, 13 pages.

Xu et al., "Non-CE8: IBC chroma mode with dual-tree", Tencent, Joint Video Experts Team (JVET) of ITU-T SG 16 WP 3 and ISO/IEC JTC 1/SC 29/WG 11, 16th Meeting: Geneva, CH, 1-11, Document: JVET-P0456-v1, Oct. 2019, 2 pages.

Notice of Refusal for KR Application No. 10-2024-7008332 dated Jul. 27, 2026, with English Translation, 19 pages.

* cited by examiner (a) horizontal split (b) vertical split

INTRA TEMPLATE MATCHING PREDICTION CHROMA BLOCK VECTOR DERIVATION FROM LUMA BLOCK VECTORS

INCORPORATION BY REFERENCE

The present application claims the benefit of priority to U.S. Provisional Application No. 63/388,597, "IBC Chroma Block Vector Derivation from Luma Block Vectors" filed on Jul. 12, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. The processing circuitry receives a coded video bitstream including a current picture. The current picture includes a chroma block in a chroma separate tree, the chroma block being collocated in a same luma area with one or more luma blocks. The processing circuitry decodes, from the coded video bitstream, a syntax element that indicates a current picture referencing (CPR) mode for the chroma block, and determines, in response to the CPR mode, a chroma block vector for the chroma block according to one or more luma block vectors associated with the one or more luma blocks. The chroma block vector indicates a reference chroma block in the current picture. The processing circuitry reconstructs the chroma block based on the reference chroma block in the current picture.

In some examples, the processing circuitry determines a block vector predictor according to the one or more luma block vectors, and decodes, from the coded video bitstream, a block vector difference. The processing circuitry determines the chroma block vector based on the block vector predictor and the block vector difference.

In some examples, the processing circuitry derives the block vector predictor from an average value of the one or more luma block vectors or a weighted average value of the one or more luma block vectors.

In some examples, the processing circuitry determines a first luma block from the one or more luma blocks, the first luma block includes a sample point corresponding to a specific sample position of the chroma block, and the processing circuitry derives the block vector predictor from a luma block vector associated with the first luma block. In an example, the specific sample position is a center sample position of the chroma block. In another example, the specific sample position is a top-left sample position of the chroma block.

In some examples, the processing circuitry decodes, from the coded video bitstream, an index indicative of a first luma block vector from the one or more luma block vectors and derives the block vector predictor from the first luma block vector.

In some examples, the processing circuitry determines a first precision of the chroma block vector from candidates that are coarser than a second precision of the one or more luma block vectors.

In some examples, the processing circuitry derives the chroma block vector from an average value of the one or more luma block vectors or a weighted average value of the one or more luma block vectors.

In some examples, the processing circuitry determines a first luma block from the one or more luma blocks, the first luma block includes a sample point corresponding to a specific sample position of the chroma block. The processing circuitry derives the chroma block vector from a luma block vector associated with the first luma block. In an example, the specific sample position is a center sample position of the chroma block. In another example, the specific sample position is a top-left sample position of the chroma block.

In some examples, the processing circuitry decodes an index indicative of a first luma block vector from the one or more luma blocks, and derives the chroma block vector from the first luma block vector.

In some examples, the luma area corresponding to the chroma block includes multiple luma blocks with respective luma block vectors, the processing circuitry derives candidate chroma block vectors from the luma block vectors, determines candidate reference templates corresponding to a current template of the chroma block according to the candidate chroma block vectors, calculates template matching costs respectively associated with the candidate chroma block vectors according to distortions between the current template and the candidate reference templates, and selects the chroma block vector from the candidate chroma block vectors based on the template matching costs, the chroma block vector has a minimum template matching cost among the candidate chroma block vectors.

In some examples, the processing circuitry orders the candidate chroma block vectors into a reordered list of candidate chroma block vectors according to the template matching costs, decodes, from the bitstream, an index indicative of the chroma block vector from the reordered list of candidate chroma block vectors and selects the chroma block vector from the reordered list according to the index.

In some examples, the processing circuitry derives an initial chroma block vector according to the one or more luma block vectors, and performs a template matching search starting from the initial chroma block vector to determine the chroma block vector.

In some examples, the processing circuitry derives the initial chroma block vector from an average value of the one or more luma block vectors or a weighted average value of the one or more luma block vectors.

In some examples, the processing circuitry determines a first luma block from the one or more luma blocks, the first luma block comprising a sample point corresponding to a specific sample position of the chroma block, and derives the initial chroma block vector from a luma block vector associated with the first luma block. In an example, the specific sample position is a center sample position of the chroma block. In another example, the specific sample position is a top-left sample position of the chroma block.

In an example, the processing circuitry decodes an index indicative of a first luma block vector from the luma block vectors, and derives the initial chroma block vector from the first luma block vector.

In some examples, to perform the template matching search further comprises, for an intermediate chroma block vector, the processing circuitry determines an intermediate chroma reference template corresponding to a current chroma template of the chroma block according to the intermediate chroma block vector, determines an intermediate luma reference template collocated with the intermediate chroma reference template, calculates a first template matching cost according to distortions between the current chroma template and the intermediate chroma reference template, calculates a second template matching cost according to distortions between a current luma template collocated with the current chroma template and the intermediate luma reference template, and calculates a combined template matching cost associated with the intermediate chroma block vector by combining the first template matching cost with the second template matching cost.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
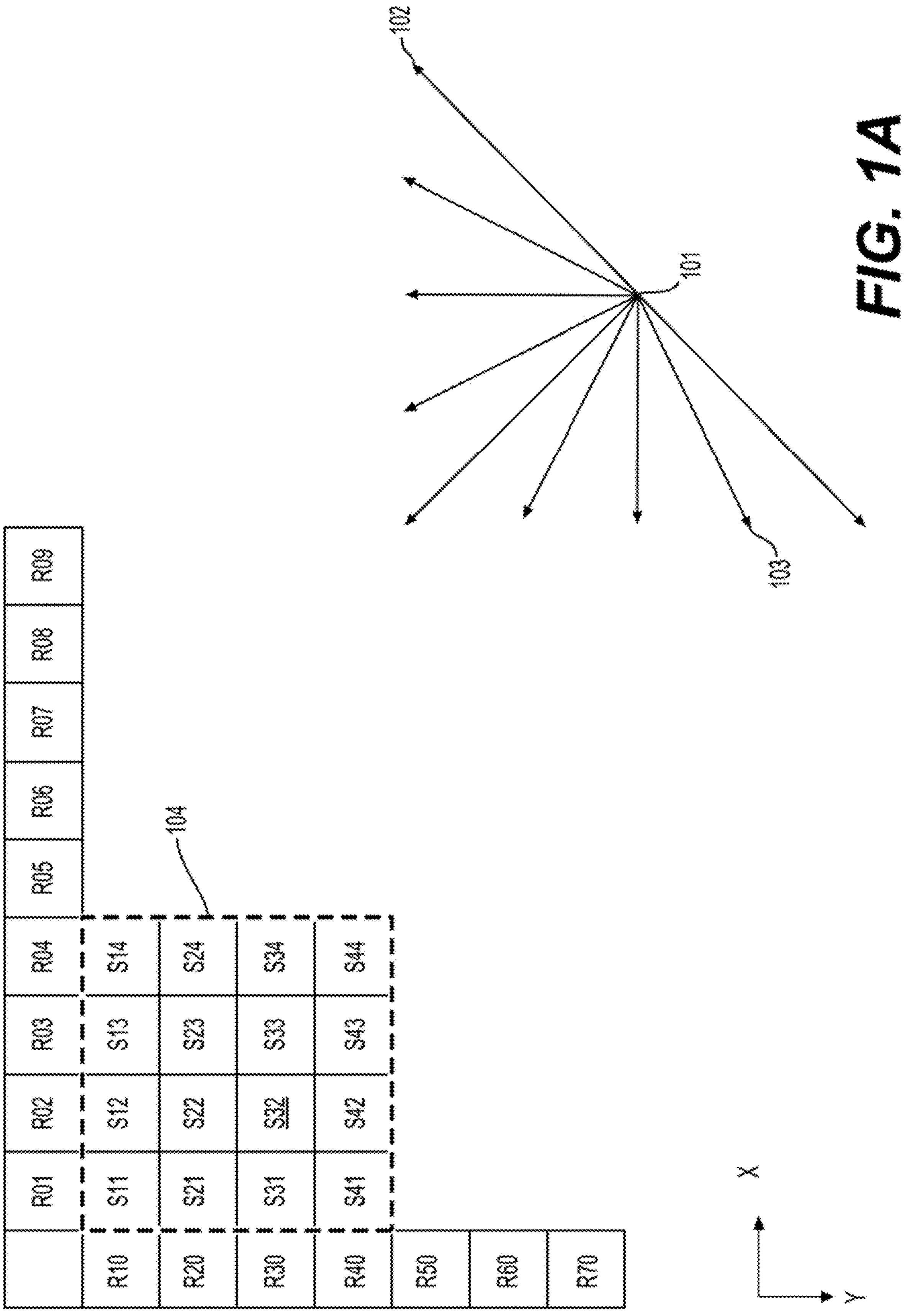
FIG. 1A is a schematic illustration of an exemplary subset of intra prediction modes.
Figure 1B:
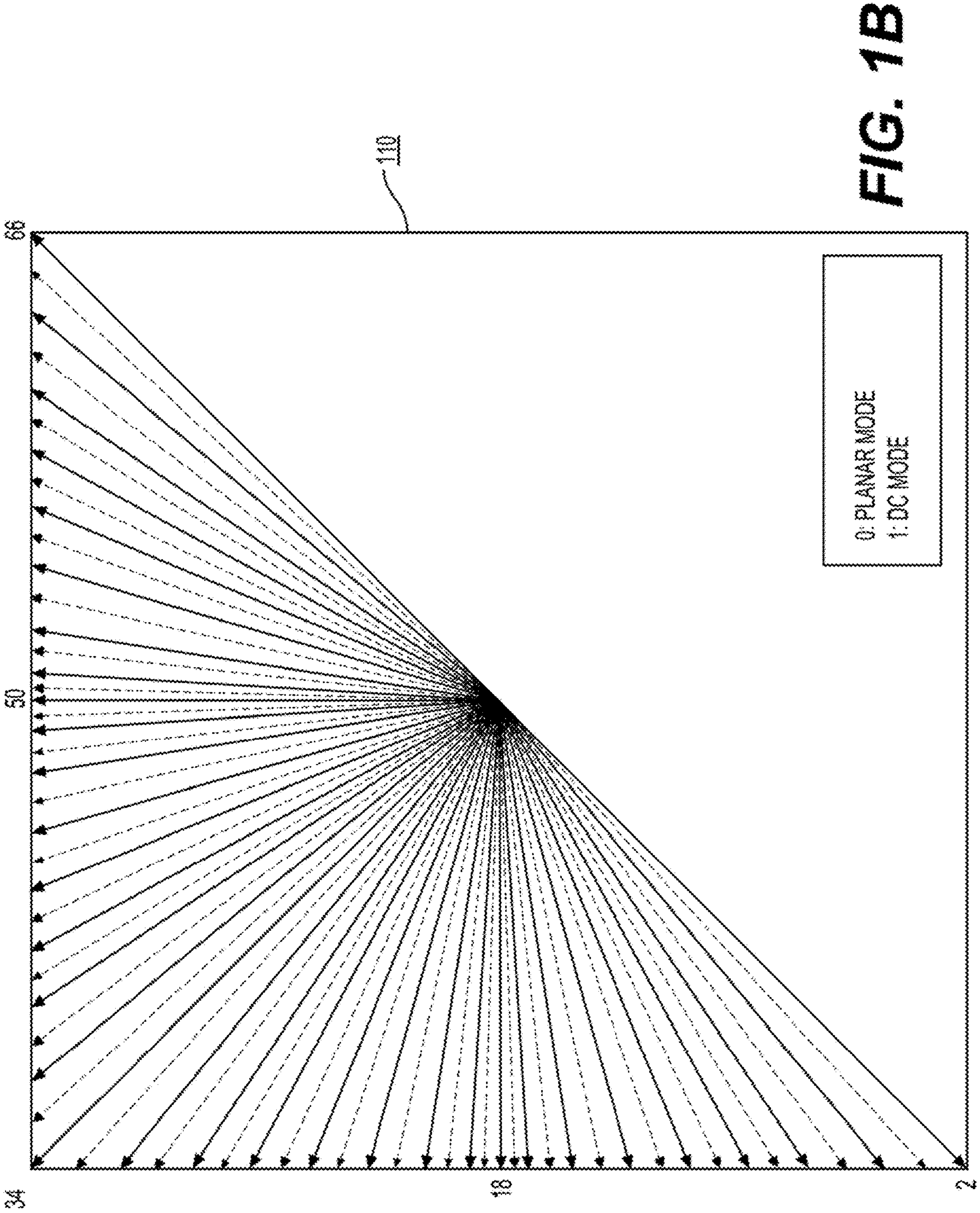
FIG. 1B is an illustration of exemplary intra prediction directions.
Figure 2:
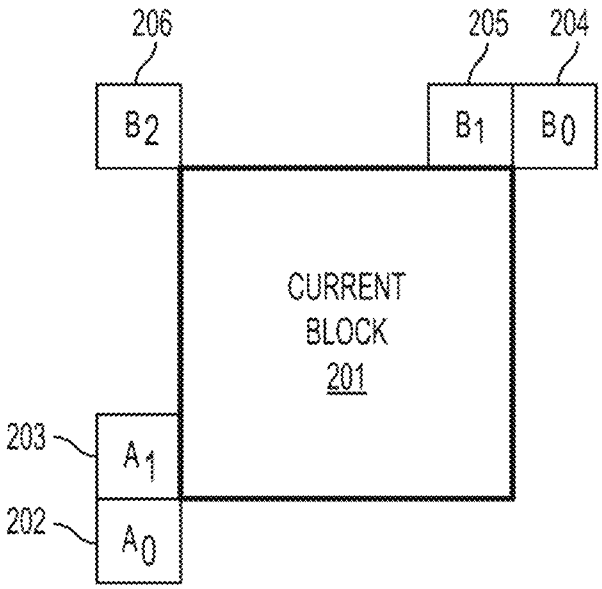
FIG. 2 (Related Art)
FIG. 2 shows an example of a current block (201) and surrounding samples.
Figure 3:
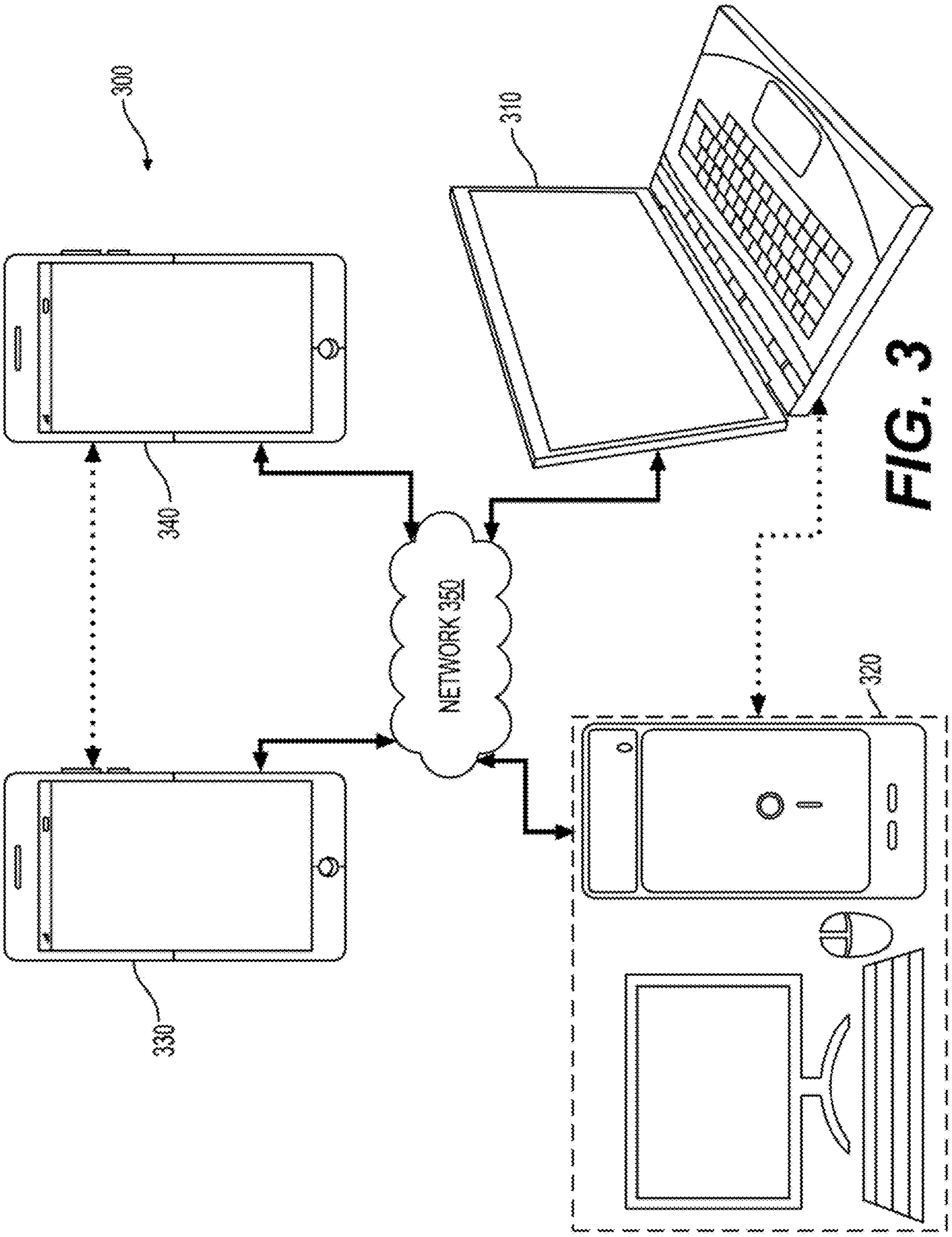
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
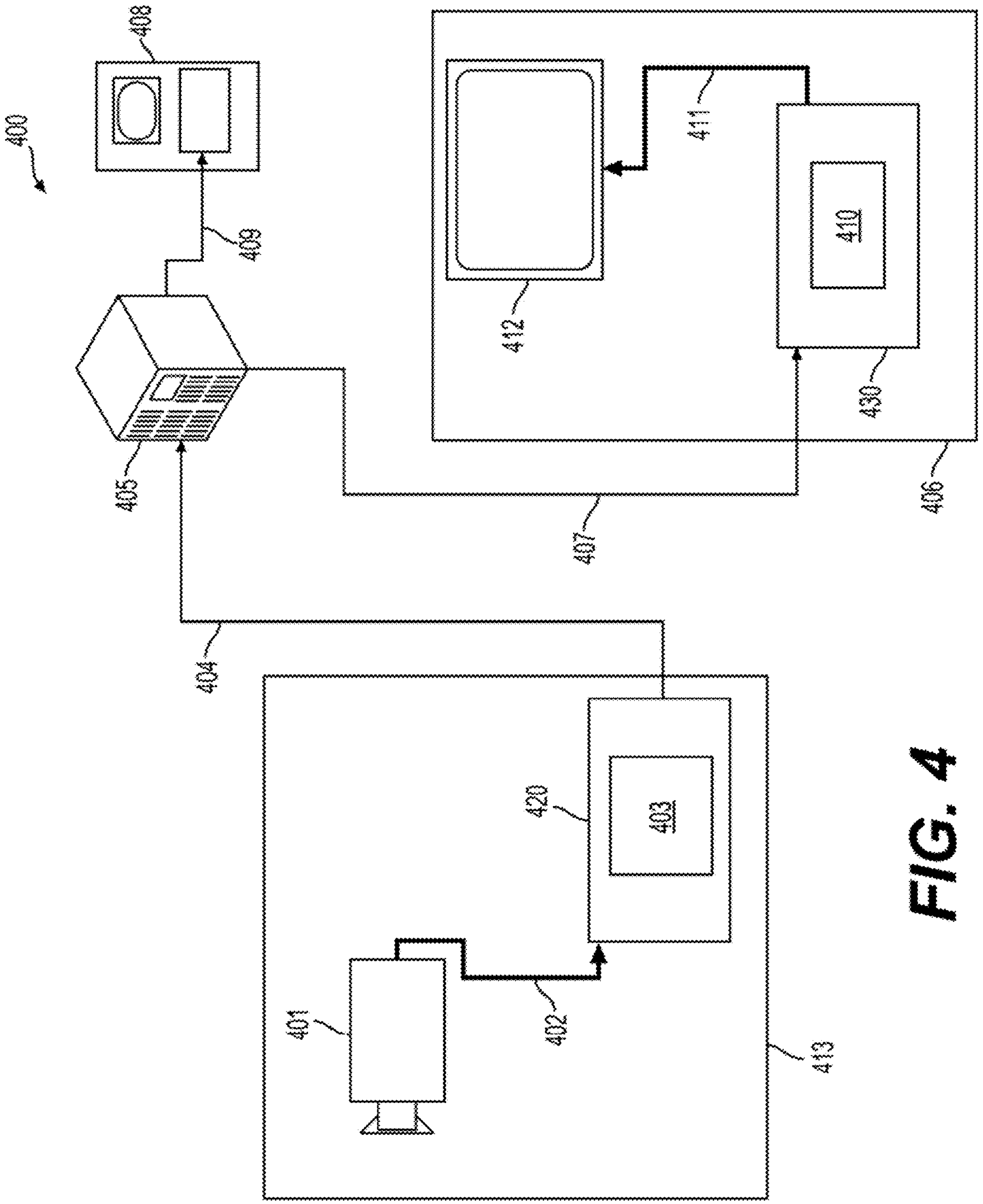
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
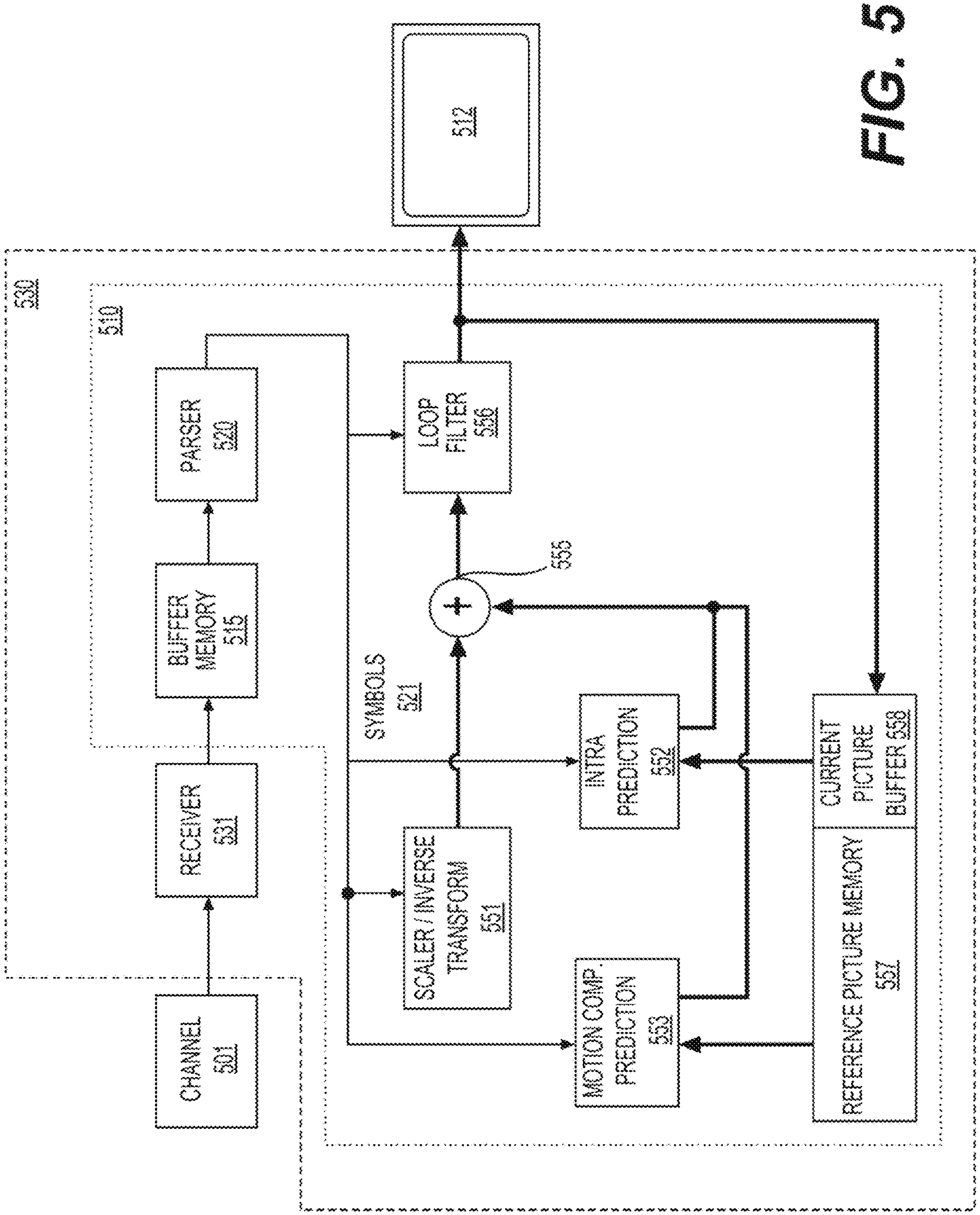
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
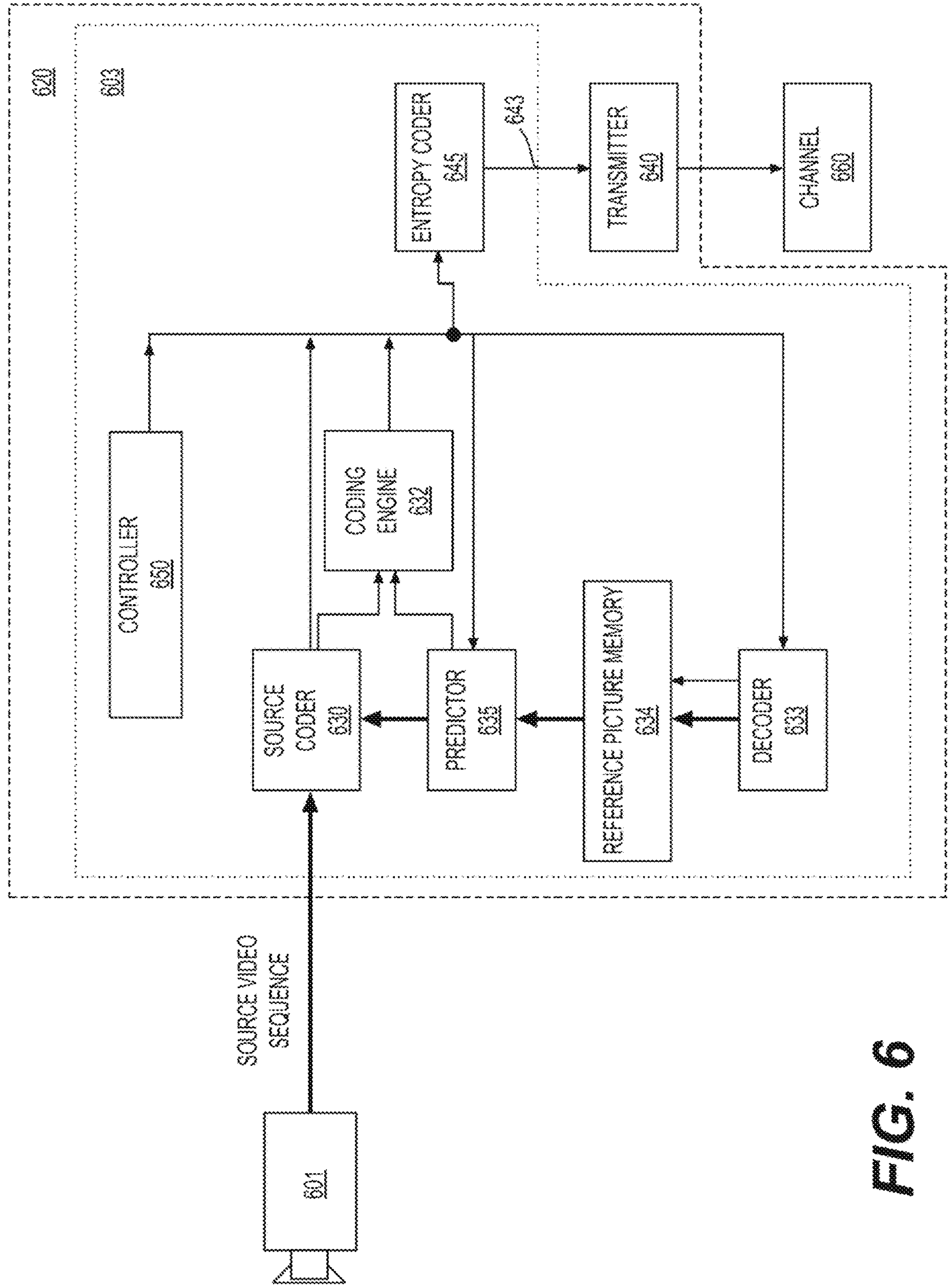
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
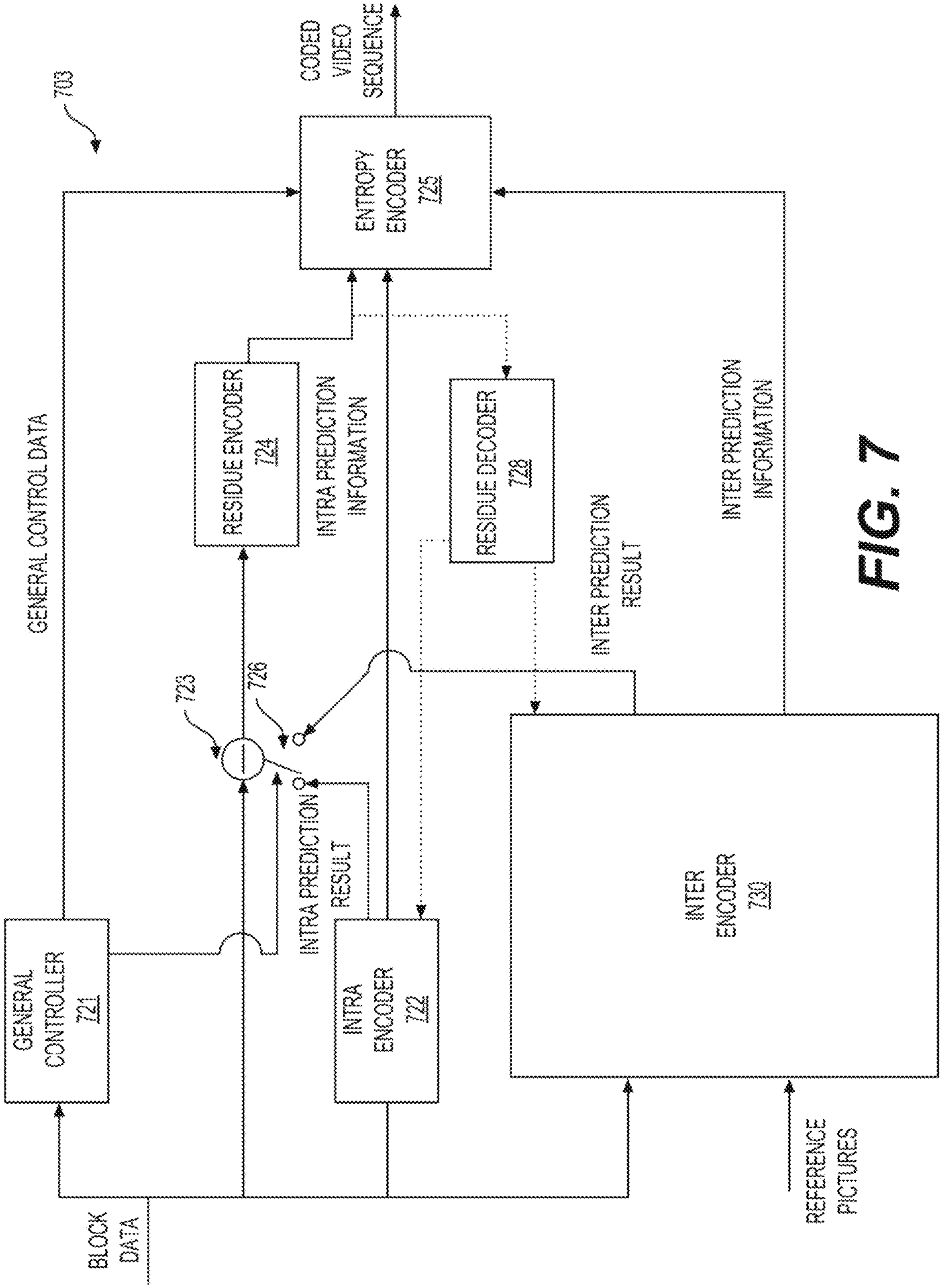
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
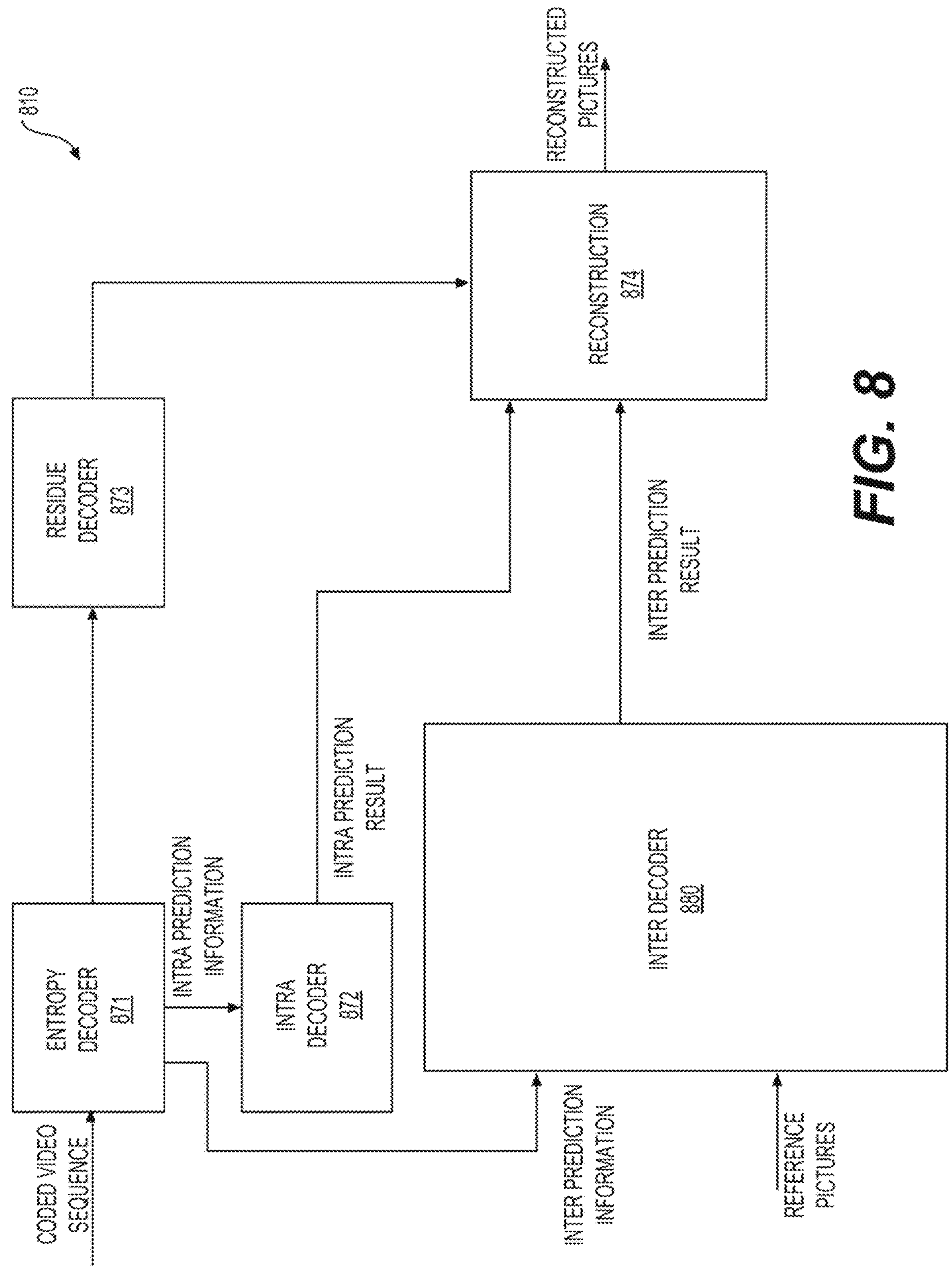
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide techniques to enable current picture referencing (e.g., IBC, IntraBC, IntraTMP) mode on chroma components when separate intra luma/chroma coding tree structure (intra dual-tree) is used. In some examples, the techniques can derive chroma block vector (BV) from luma BVs.

IBC mode has applications in various video codecs, such as HEVC, VVC, AOMedia Video 1 (AV1), and the like. IBC coding tools are used in IBC mode for image/video coding. Different video codecs may have specific features or IBC coding tools.

Some IBC coding tools are used in the HEVC Screen Content Coding (SCC) extensions as current picture referencing (CPR). The IBC mode can use coding technologies that are used for inter prediction where a current picture is used as a reference picture in the IBC mode. A benefit of using the IBC mode is a referencing structure of the IBC mode where a two-dimensional (2D) spatial vector can be used as the representation of an addressing mechanism to reference samples. A benefit of an architecture of the IBC mode is that the integration of IBC requires relatively minor changes to the specification and can ease the implementation burden if manufacturers have already implemented certain inter prediction technologies, such as the HEVC version 1. CPR in the HEVC SCC extensions can be a special inter prediction mode, resulting in a same syntax structure as the syntax structure of the inter prediction mode and a decoding process that is similar to a decoding process of the inter prediction mode.

The IBC mode can be integrated into the inter prediction process. In some examples, the IBC mode (or CPR) is an inter prediction mode, and an intra-only predicted slice is to become a predicted slice to allow the usage of the IBC mode. When the IBC mode is applicable, a coder can extend a reference picture list by one entry for a pointer to point to the current picture. For example, the current picture uses a one picture-sized buffer of a shared decoded picture buffer (DPB). The IBC mode signaling can be implicit. For example, when the selected reference picture points to the current picture, a CU can employ the IBC mode. In various embodiments, reference samples used in the IBC process are not filtered, which is different from a regular inter prediction. The corresponding reference picture used in the IBC process is a long-term reference. To minimize the memory requirement, the coder can release the buffer after reconstructing the current picture, for example, the coder immediately releases the buffer after reconstructing the current picture. A filtered version of the reconstructed picture can be put back into the DPB by the coder as a short-term reference when the reconstructed picture is a reference picture.

In block vector (BV) coding, referencing to a reconstructed area can be performed via a 2D BV which is similar in inter prediction. Prediction and coding of a BV can reuse MV prediction and coding in the inter prediction process. In some examples, a luma BV is in an integer resolution rather than a ¼-th precision of a MV as used for a regular inter coded CTU.

Figure 9:
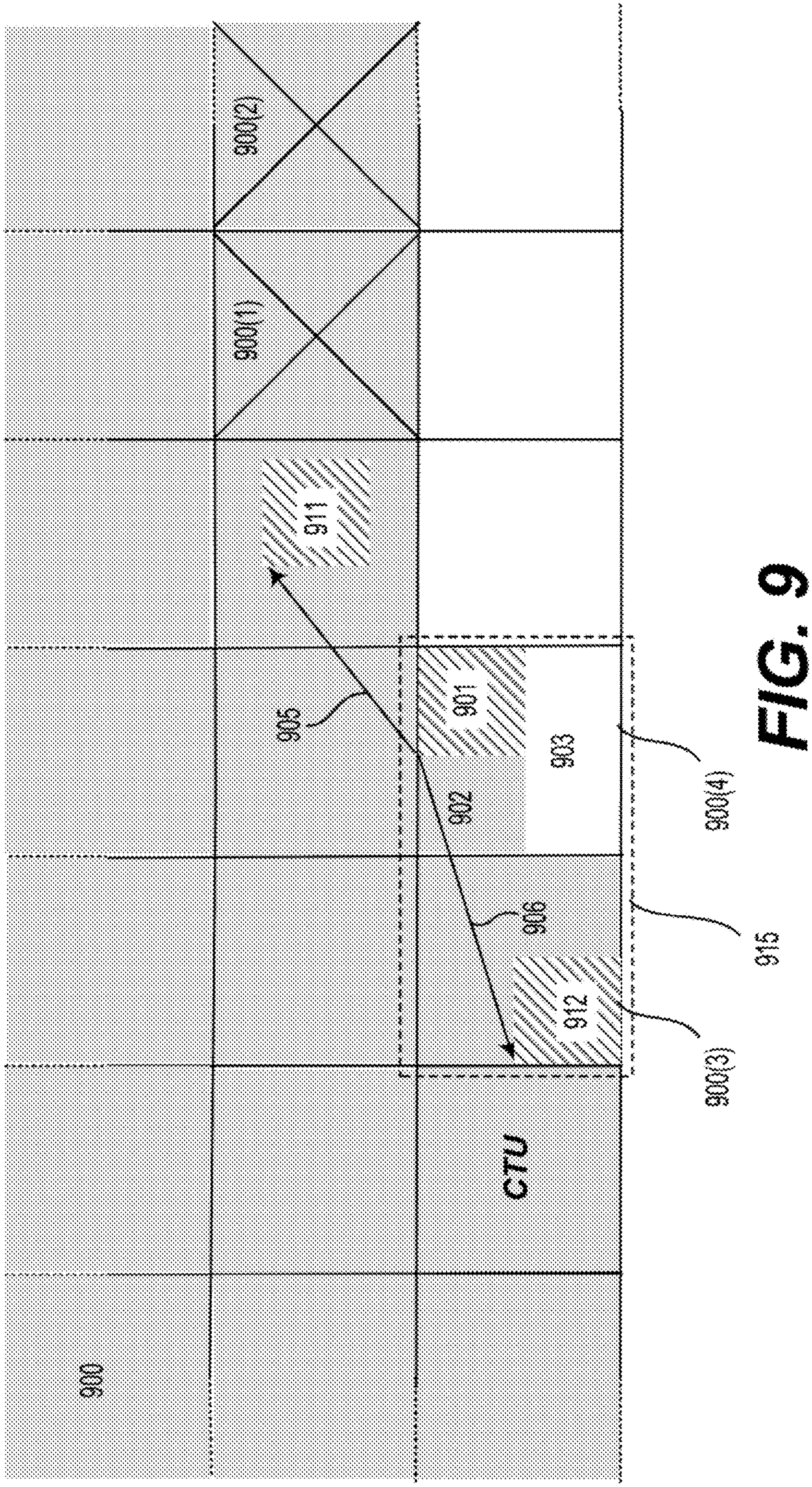
FIG. 9 shows block vectors associated with a current CU according to embodiments of the disclosure.

FIG. 9 shows BVs associated with a current CU (901) according to embodiments of the disclosure. Each square (900) can represent a CTU. A gray-shaded area represents an already coded area (e.g., an already encoded area), and a white, non-shaded area represents an area to be coded (e.g., an area to be encoded). A current CTU (900(4)) that is under reconstruction includes the current CU (901), a coded area (902), and an area (903) to be coded. In an example, the area (903) will be coded after coding the current CU (901).

In an example, such as in HEVC, the gray-shaded area except for the two CTUs (900(1)-900(2)) that are on the right above the current CTU (900(4)) can be used as a reference area in the IBC mode to allow a Wavefront Parallel Processing (WPP). A BV that is allowed in HEVC can point to a block that is within the reference area (e.g., the gray-shaded area excluding the two CTUs (900(1)-900(2))). For example, a BV (905) that is allowed in HEVC points to a reference block (911).

In an example, such as in VVC, in addition to the current CTU (900(4)), only the left neighboring CTU (900(3)) to the left of the current CTU (900(4)) is allowed as a reference area in the IBC mode. In an example, the reference area used in the IBC mode in VVC is within a dotted area (915) and includes samples that are coded. For example, a BV (906) that is allowed in VVC points to a reference block (912).

In some examples, a decoded motion vector difference (MVD) (also referred to as a BV difference (BVD)) of a BV can be left-shifted by two before adding to a corresponding BV predictor to reconstruct a final BV.

In some embodiments, special handling of the IBC mode may be necessary for implementation and performance reasons, and the IBC mode and the inter prediction mode (e.g., the regular inter prediction mode) can differ, such as described below. In an example, reference samples used in the IBC mode are unfiltered (e.g., reconstructed samples before in-loop filtering processes, such as a DBF and a sample adaptive offset (SAO) filter are applied). Other inter prediction modes (e.g., the regular inter prediction mode) of HEVC can use filtered samples, for example, reference samples that are filtered by the in-loop filtering processes.

In some examples, luma sample interpolation is not performed in the IBC mode. Chroma sample interpolation can be performed in the IBC mode. In some examples, chroma sample interpolation is only necessary when a chroma BV is a non-integer when the chroma BV is derived from a corresponding luma BV. In some examples, luma sample interpolation and chroma samples interpolation can be performed in the regular inter prediction mode.

In the IBC mode, a special case can occur when a chroma BV is a non-integer BV and a reference block is near a boundary of an available area (e.g., a reference area). For example, surrounding reconstructed samples can be outside the boundary to perform the chroma interpolation. In an example, a BV pointing to a single next-to-border line may result in the surrounding reconstructed samples being outside the boundary.

According to an aspect of the disclosure, IBC architecture in VVC has specific features.

An effective reference area for the IBC mode in the HEVC SCC extensions can include an entire already reconstructed area of a current picture with some exceptions for parallel processing purposes, such as described in FIG. 9. A drawback of the reference area used in HEVC can include a requirement for additional memory in the DPB, for which hardware implementations may employ external memory. An additional access to the external memory can increase a memory bandwidth, and using the DPB can be less attractive. In some embodiments, a fixed memory (e.g., a memory having a fixed size) that can be realized on-chip for the IBC mode can be used in VVC. The on-chip fixed memory in the IBC mode can significantly decrease the complexity of implementing the IBC mode in hardware architectures. In an example, the on-chip fixed memory in the IBC mode can decrease a latency. In some examples, a modification addresses a signaling concept that is departed from the integration within the inter prediction process as in the HEVC SCC extensions.

In examples shown in FIGS. 10A-10D, a fixed memory can be allocated to store a reference area used in the IBC mode. The fixed memory can be referred to as a reference sample memory (RSM). A portion of the RSM can be updated at different intermediate times during a coding process (e.g., an encoding process or a reconstruction process). FIGS. 10A-10D show an RSM update process at various intermediate times during the coding process (e.g., the encoding process or the reconstruction process) according to embodiments of the disclosure. FIGS. 10A-10D show reference areas for the IBC mode in VVC and configurations in VVC.

Referring to FIGS. 10A-10D, a current CTU (1020) is adjacent to a CTU (e.g., a left neighboring CTU) (1010) that is to the left of the current CTU (1020). In some examples, the current CTU (1020) includes four areas (1021)-(1024). The left neighboring CTU (1010) can include four areas (1011)-(1014) that correspond to the areas (1021)-(1024), respectively. Positions of the areas (1011)-(1014) are left-shifted by a width of the CTU (1020) from positions of the areas (1021)-(1024), respectively. The RSM can include a portion of the current CTU (1020) and/or a portion of the left neighboring CTU (1010). In the examples shown in FIGS. 10A-10D, a size of the RSM is equal to a size of the CTU. Light-gray shaded areas can include reference samples of the left neighboring CTU (1010), dark-gray shaded areas can include reference samples of the current CTU (1020), and white, non-shaded areas can represent areas to be coded (e.g., upcoming coding areas).

Figure 10A:
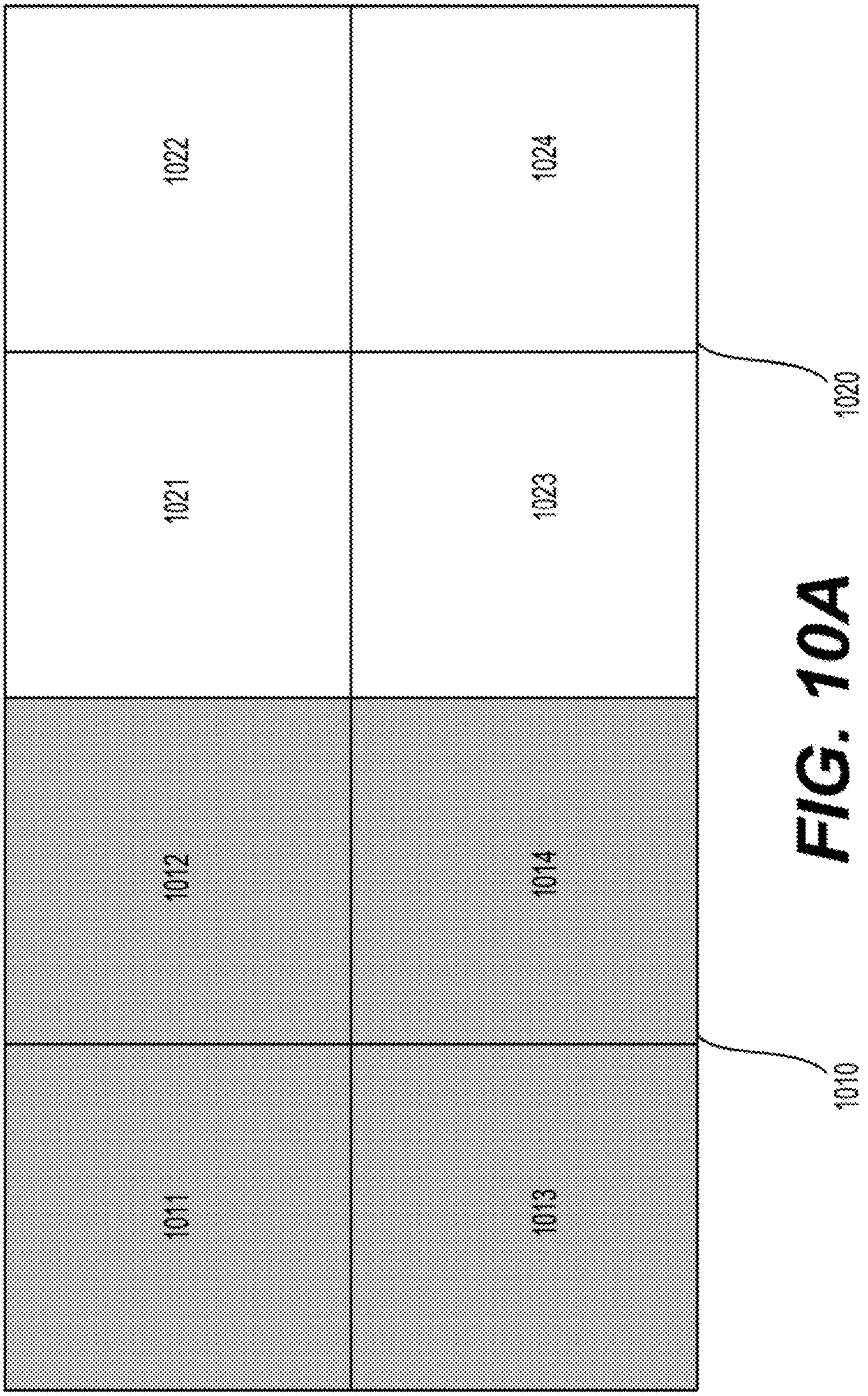
FIGS. 10A-10D show reference areas for an intra block copy (IBC) mode according to embodiments of the disclosure.

Referring to FIG. 10A, at a first intermediate time of the coding process that is a beginning of the coding process of the current CTU (1020), the RSM includes the entire left neighboring CTU (1010), and the entire left neighboring CTU (1010) can serve as the reference area in the IBC mode at the beginning of the coding process of the current CTU (1020). The RSM at the beginning of the coding process of the current CTU (1020) includes none of the areas (1021)-(1024).

Figure 10B:
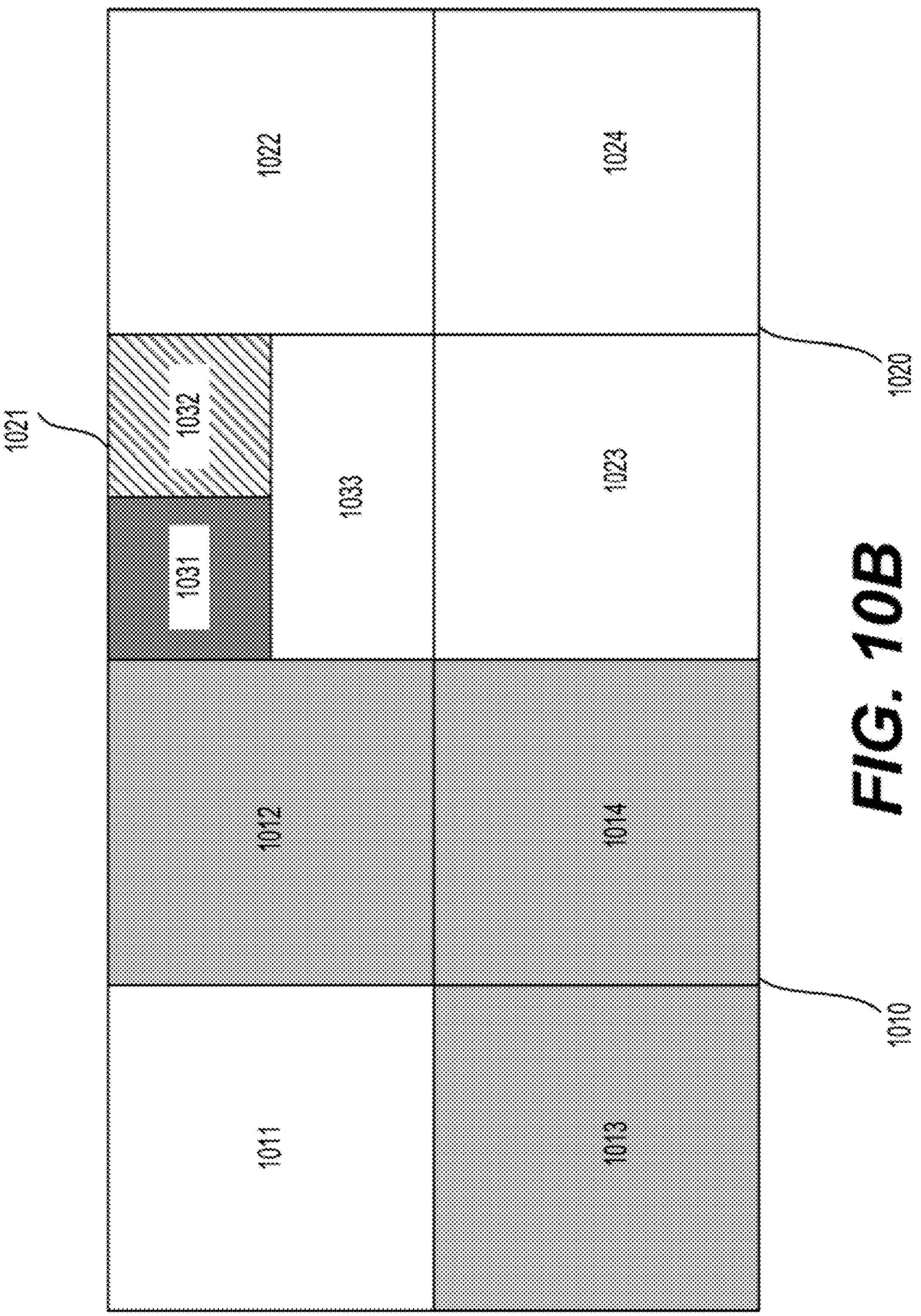

Referring to FIG. 10B, the area (1021) includes sub-areas (1031)-(1033). The sub-area (1031) is already coded (e.g., encoded or reconstructed), the sub-area (1032) is a current CU that is being coded (e.g., being encoded or under reconstruction), and the sub-area (1033) is to be coded subsequently. At a second intermediate time of the coding process of the current CTU (1020) where the sub-area (1032) of the current CTU (1020) is being coded, the RSM is updated to include a portion of the left neighboring CTU (1010) and a portion of the current CTU (1020). For example, the RSM includes the areas (1012)-(1014) of the left neighboring CTU (1010) and the sub-area (1031) of the current CTU (1020). The reference area at the second intermediate time can include the areas (1012)-(1014) of the left neighboring CTU (1010) and the sub-area (1031) of the current CTU (1020).

Figure 10C:
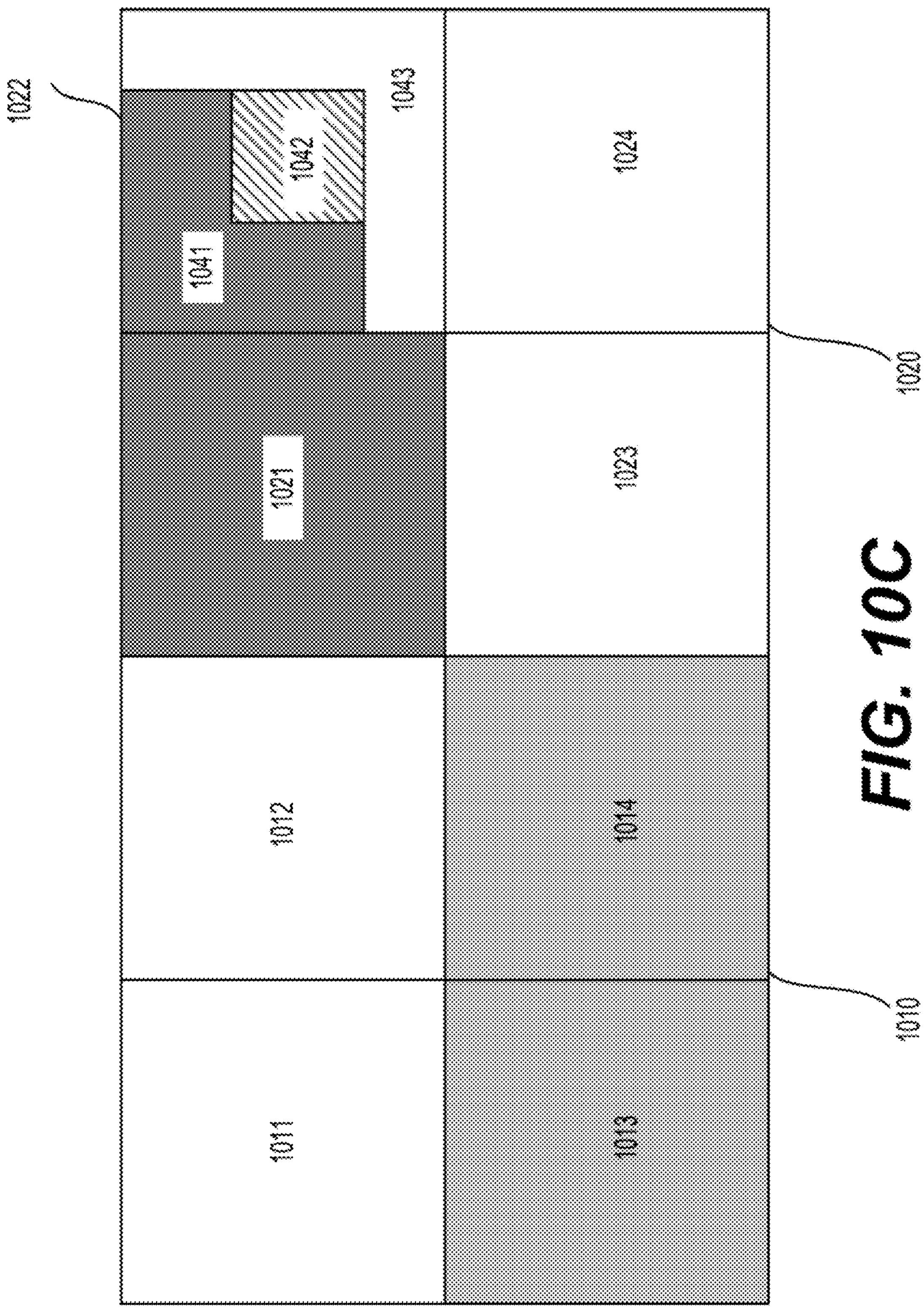

Referring to FIG. 10C, the area (1022) includes sub-areas (1041)-(1043). The sub-area (1041) (in dark-gray shading) is already coded (e.g., encoded or reconstructed), the sub-area (1042) is a current CU that is being coded (e.g., being encoded or under reconstruction), and the sub-area (1043) (in white color) is to be coded subsequently. At a third intermediate time of the coding process of the current CTU (1020) where the sub-area (1042) of the current CTU (1020) is being coded, the RSM is updated to include (i) the areas (1013)-(1014) of the left neighboring CTU (1010) and (ii) the area (1021) and the sub-area (1041) of the current CTU (1020). In the RSM, the area (1012) is replaced by the sub-area (1041). The reference area at the third intermediate time can include (i) the areas (1013)-(1014) of the left neighboring CTU (1010) and (ii) the area (1021) and the sub-area (1041) of the current CTU (1020).

Figure 10D:
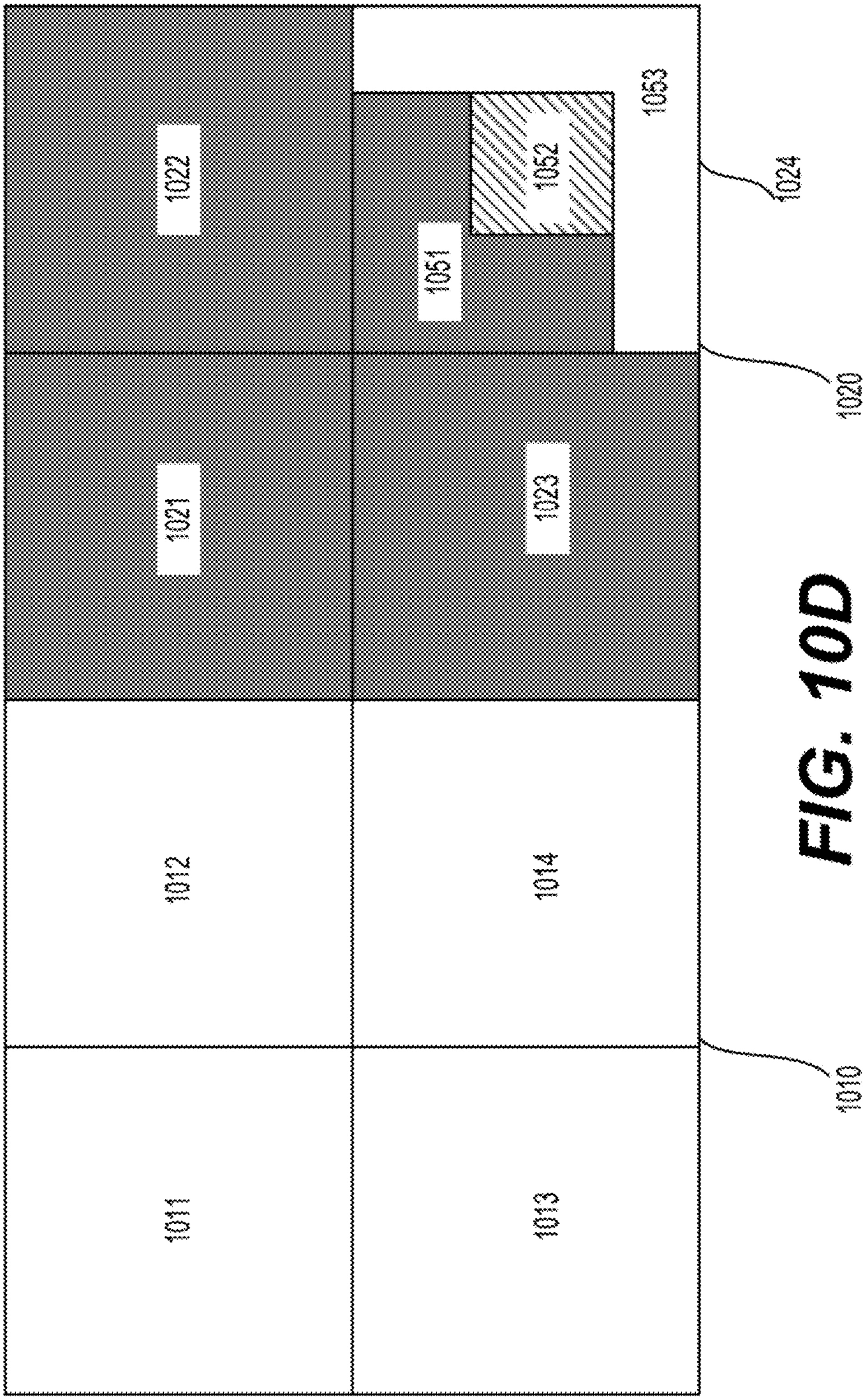

Referring to FIG. 10D, the area (1024) includes sub-areas (1051)-(1053). The sub-area (1051) (in dark-gray shading) is already coded (e.g., encoded or reconstructed), the sub-area (1052) is a current CU that is being coded (e.g., being encoded or under reconstruction), and the sub-area (1053) (in white color) is to be coded subsequently. At a fourth intermediate time of the coding process of the current CTU (1020) where the sub-area (1052) of the current CTU (1020) is being coded, the RSM is updated to include the areas (1021)-(1023) and the sub-area (1051) of the current CTU (1020). The RSM at the fourth intermediate time includes no areas in the left neighboring CTU (1010). The reference area at the fourth intermediate time can include the areas (1021)-(1023) and the sub-area (1051) of the current CTU (1020).

According to an aspect of the disclosure, VVC has specific syntax and semantics for the IBC Mode.

The IBC architecture in VVC can form a dedicated coding mode where the IBC mode is the third prediction mode in addition to the intra prediction mode and the inter prediction mode (e.g., the regular inter prediction mode). A bitstream can include an IBC syntax element indicating the IBC mode for a CU, for example, when a size of the CU is equal to or less than 64×64. In some examples, the largest CU size that can utilize the IBC mode is 64×64 to realize a continuous memory update mechanism of the RSM, such as described with references to FIGS. 10A-10D. In an example, a reference sample addressing mechanism remains identical to that used in the HEVC SCC extensions by denoting a 2D offset and reusing a vector (e.g., an MV) coding process of the inter prediction mode. In an example, when the chroma separate tree (CST) is active, a coder cannot derive a chroma BV from a corresponding luma BV, resulting in the usage of the IBC mode only for a luma CB.

The IBC design in VVC can employ a fixed memory size (e.g., 128×128) for each color component to store reference samples. As described above, the fixed memory size can enable an on-chip placement of the memory (e.g., the RSM) in hardware implementations. In an example, such as in VVC, the maximum CTU size and the fixed memory size for the IBC mode are 128×128. In an example, the RSM includes samples of a single CTU when the maximum CTU size configuration is equal to the fixed memory size for the IBC mode (e.g., 128×128).

A feature of the RSM is the continuous update mechanism to replace reconstructed samples of a left neighboring CTU with reconstructed samples of a current CTU, such as described in FIGS. 10A-10D. FIGS. 10A-10D show simplified RSM examples for the update mechanism at the four intermediate times during the coding process (e.g., the reconstruction process). The light-gray shaded area in FIGS. 10A-10C can include the reference samples of the left neighboring CTU (1010), and the dark-gray shaded area in FIGS. 10B-10D can include the reference samples of the current CTU (1020). Referring to FIG. 10A, at the first intermediate time that represents the beginning of coding (e.g., encoding or reconstruction) of the current CTU (1020), the RSM consists of the reference samples of the left neighboring CTU (1010) only. In the other three intermediate times shown in FIGS. 10B-10D, the coding process (e.g., the encoding process or the reconstruction process) has replaced samples of the left neighboring CTU (1010) with samples in the current CTU (1020).

Figure 11:
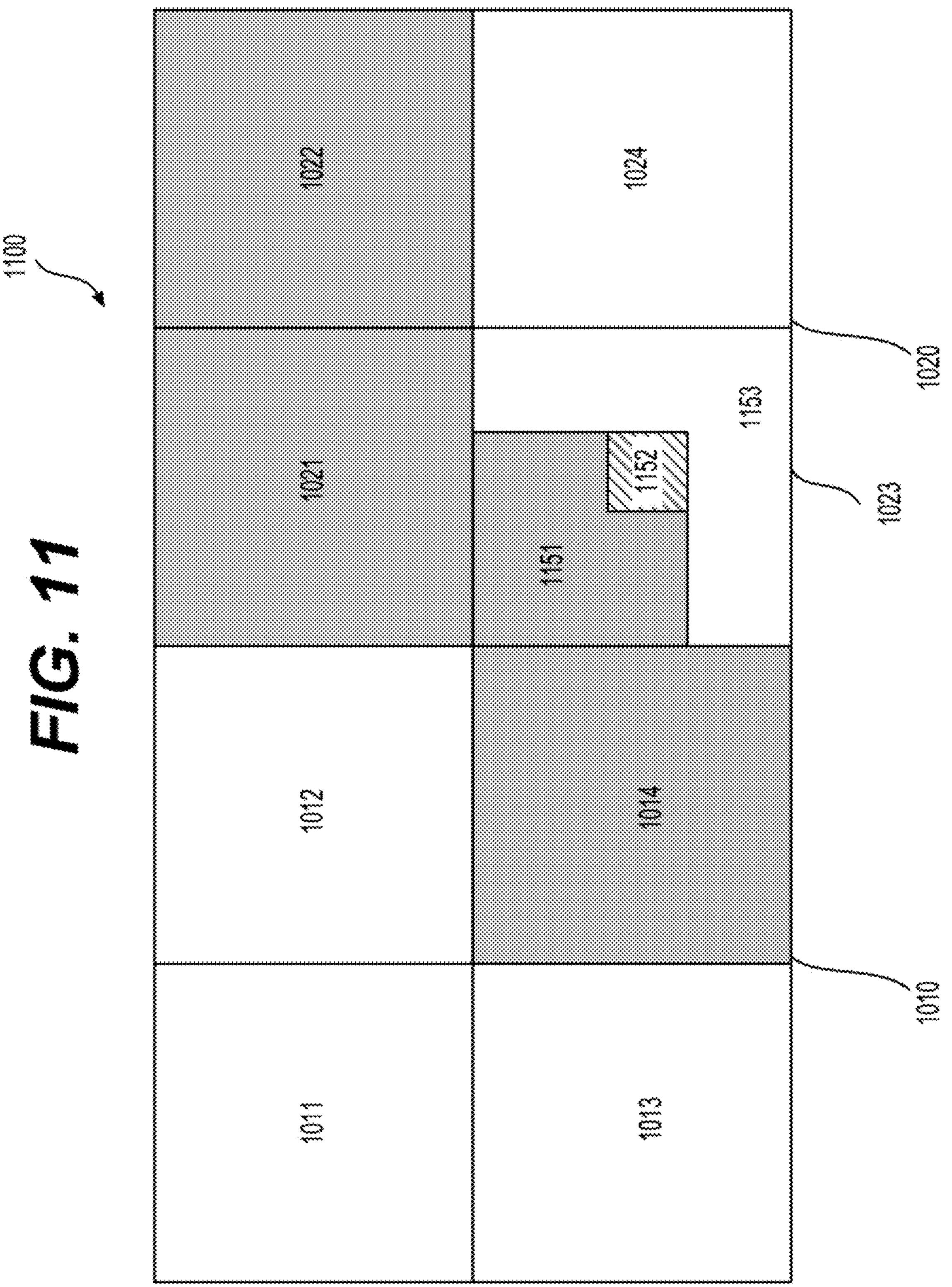
FIG. 11 shows an exemplary continuous update process of a reference sample memory (RSM) spatially.

In some examples, the RSM is implicitly divided into four areas, such as four disjoint areas of 64×64. A reset of an area in the RSM can occur when a coder processes the first CU that is in a corresponding area in a current CTU, easing the hardware implementation efforts. For example, the RSM is mapped to areas in CTU(s) (e.g., a left neighboring CTU and the current CTU). FIG. 11 shows a continuous update process (1100) of the RSM spatially. The left neighboring CTU (1010) and the current CTU (1020) are described in FIGS. 10A-10D. The left neighboring CTU (1010) can include the areas (1011)-(1014). The current CTU (1020) can include the areas (1021)-(1024). The area (1023) in the current CTU (1020) includes a current CU (1152) that is being coded, a sub-area (1151) that is already coded, a sub-area (1153) that is to be coded. Gray shaded areas can include samples stored in the RSM, and the white, non-shaded areas can include replaced samples or uncoded samples (e.g., unreconstructed samples).

At a coding time (e.g., a reconstruction time) shown in FIG. 11, the RSM update process has replaced samples covered by the white, non-shaded areas (e.g., the areas (1011)-(1013)) in the left neighboring CTU (1010) with the gray-shaded areas (e.g., the areas (1021)-(1022) and the sub-area (1151)) of the current CTU (1020). In FIG. 11, the RSM can include (i) the area (1014) in the left neighboring CTU (1010) and (ii) the areas (1021)-(1022) and the sub-area (1051) of the current CTU (1020).

In some examples, the RSM may include more than a single left neighboring CTU when the maximum CTU size is less than the RSM size (e.g., 128×128), and multiple neighboring CTUs can be used as the reference area in the IBC mode. For example, when the maximum CTU size is equal to 32×32, the RSM having a size of 128×128 can include samples of 15 neighboring CTUs.

In VVC, the BV coding in the IBC mode can employ processes specified for the inter prediction (e.g., the regular inter prediction). The BV coding can employ rules that are simpler than rules used in the inter prediction (e.g., the regular inter prediction) to construct a candidate list.

For example, a candidate list for the inter prediction includes five spatial candidates, one temporal candidate, and six history-based candidates. Multiple candidate comparisons can be used for history-based candidates to avoid duplicate entries in the final candidate list for the inter prediction. The candidate list for the inter prediction may include pairwise averaged candidates.

A candidate list for the IBC mode can include two BVs from respective spatial neighbors and five history-based BVs (HBVP). In an example, a candidate list for the IBC mode is limited to two BVs from respective spatial neighbors and five history-based BVs (HBVP). In an embodiment, in the IBC mode, only the first HBVP is compared with the spatial candidates when the first HBVP is added to the candidate list.

The regular inter prediction mode can use two different candidate lists, for example, one candidate list for the merge mode and the other candidate list for the regular mode (e.g., the inter prediction mode that is not the merge mode). The candidate list in the IBC mode can be identical for both IBC modes (e.g., a merge IBC mode and a regular IBC mode). In the IBC mode, the merge mode may use up to six candidates of the candidate list, and the regular mode uses only the first two candidates of the candidate list.

Block vector difference (BVD) coding can employ the MVD process used in the regular inter prediction mode, and a final BV can have any magnitude. The determined BV (e.g., the reconstructed BV) may point to an area outside of the reference sample area. In an example, a correction to the absolute offset for each direction can be applied using a modulo operation based on a width and/or a height of the RSM.

According to an aspect of the disclosure, block vectors of chroma blocks can be derived from block vectors of luma blocks in some examples.

In some examples, when the current coding tree type is SINGLE_TREE, a chroma block always has a corresponding luma block. In the IBC mode, the BV of the chroma block can be derived from the BV of the corresponding luma block, with proper scaling according to the chroma sampling format (e.g., 4:2:0, 4:2:2) and chroma BV precision.

In some examples, a derivation process is used to derive BV for a chroma block from BV of corresponding luma block. Input to the derivation process includes a luma block vector (bvL denotes luma block vector, bvL[0] denotes x component and bvL[1] denotes y component) in 1/16 fractional-sample accuracy, and output of the derivation process includes a chroma block vector (bvC denotes chroma block vector, bvC[0] denotes x component and bvL[1] denotes y component) in 1/32 fractional-sample accuracy.

In some examples, a chroma block vector is derived from the corresponding luma block vector according to Eq. (1) and Eq. (2):

$$bvC[0]=((bvL[0]>>(3+\text{SubWidthC}))\times 32 \quad \text{Eq. (1)}$$

$$bvC[1]=((bvL[1]>>(3+\text{SubHeightC}))\times 32 \quad \text{Eq. (2)}$$

where the variables SubWidthC and SubHeightC are specified in Table 1. The variables SubWidthC and SubHeightC depend on the chroma format sampling structure, which is specified through sps_chroma_format_idc.

TABLE 1

SubWidthC and SubHeightC values

| sps_chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

For example, when sps_chroma_format ide is equal to 0, the chroma format is monochrome sampling format, there is only one sample array nominally considered the luma array. When sps_chroma_format_idc is equal to 1, chroma format is 4:2:0 sampling format, each of the two chroma arrays has half the height and half the width of the luma array. When sps_chroma_format_idc is equal to 2, chroma format is 4:2:2 sampling format, each of the two chroma arrays has the same height and half the width of the luma array. When sps_chroma_format_idc is equal to 3, chroma format is 4:4:4 sampling, each of the two chroma arrays has the same height and width as the luma array.

In some examples, the number of bits necessary for the representation of each of the samples in the luma and chroma arrays in a video sequence is in the range of 8 to 16, inclusive.

In some examples, such as in AV1, the IBC mode is referred to as IntraBC mode, that uses a BV to locate a prediction block in a same picture of a current block. The BV can be signaled in a bitstream and a precision of the signaled BV can be integer-point. The prediction process in the IBC mode can be similar to a prediction process in the inter prediction mode (e.g., the inter-picture prediction). A difference between the IBC mode and the inter-picture prediction is described as below. In the IBC mode, a predictor block can be formed from reconstructed samples (e.g., before applying the loop filtering) of the current picture. The IBC mode can be considered as "motion compensation" within the current picture using the BV as an MV.

In the AV1, a flag that indicates whether the IBC mode is enabled or not for the current block can be transmitted in the bitstream. If the IBC mode is enabled for the current block, a BV difference can be derived by subtracting the predicted BV from the current BV, and the BV difference can be classified into four types according to a horizontal component and a vertical component of a value of the BV difference. The type information can be signaled into the bitstream, and the BV difference value of the two components (e.g., the horizontal component and the vertical component) can be signaled following the type information.

In the AV1, the IBC mode can be effective to code a screen content. The IBC mode may introduce challenges to hardware design. To facilitate the hardware design, some modifications can be adopted in the IBC mode, for example in AV1.

In an example of a first modification, when the IBC mode is allowed, loop filters can be disabled. The loop filters can include a deblocking filter, a constrained directional enhancement filter (CDEF), and a loop restoration (LR) filter. By disabling the loop filters, a second picture buffer dedicated to enable the IBC mode can be avoided.

In an example of a second modification, to facilitate parallel decoding, the prediction cannot exceed the restricted areas. Coordinates of a top-left position of a superblock are (x0, y0). For the superblock, the prediction at a position (x, y) can be accessed by the IBC mode if the vertical coordinate is less than y0 and the horizontal coordinate is less than (x0+2(y0−y)). In an example, the prediction at the position (x, y) can be accessed by the IBC mode only if the vertical coordinate is less than y0 and the horizontal coordinate is less (x0+2(y0−y)). In an example, the prediction at the position (x, y) can be accessed by the IBC mode only if the vertical coordinate is less than or equal to y0 and the horizontal coordinate is less (x0+2(y0−y)).

Figure 12:
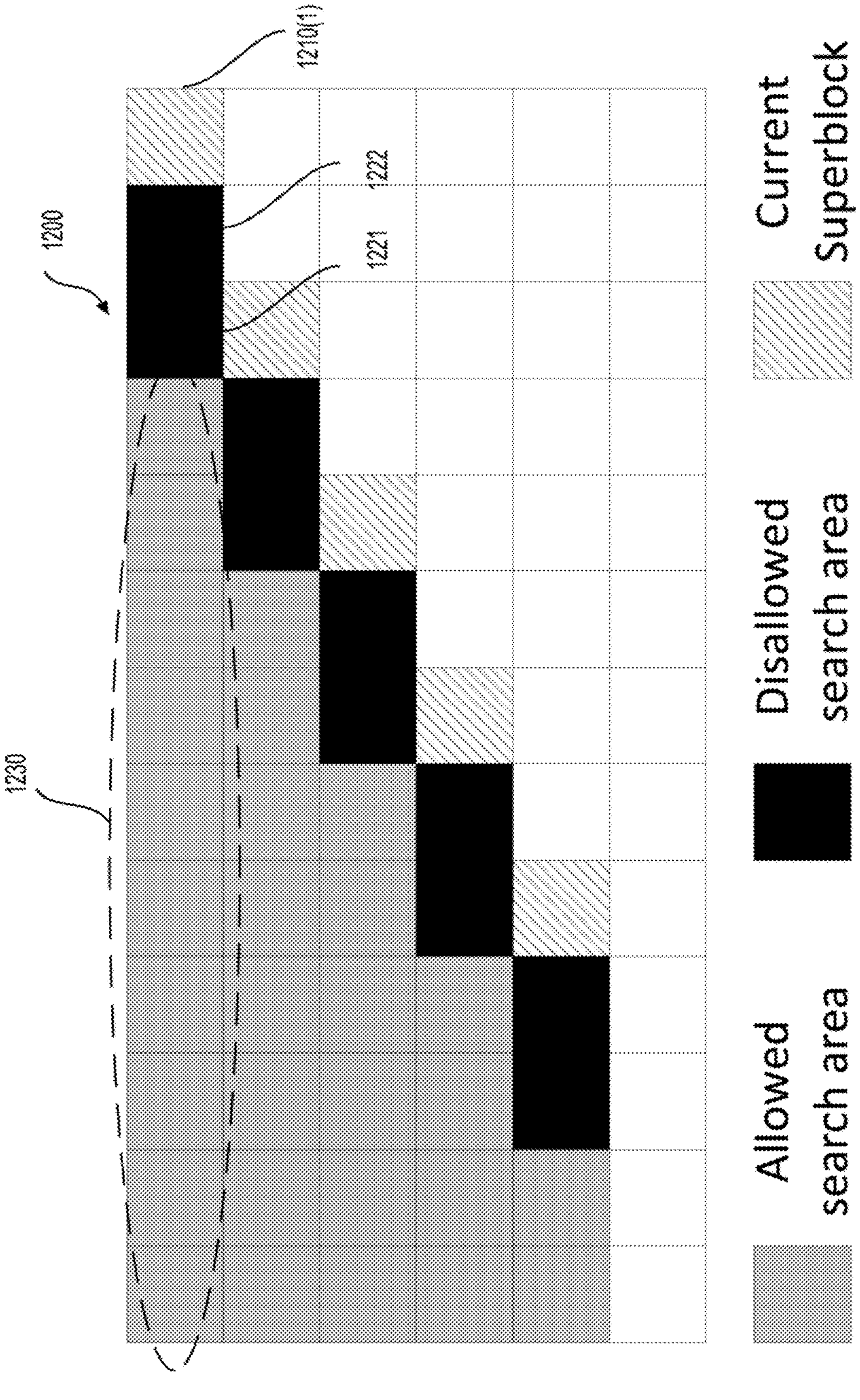
FIG. 12 shows an example of immediate reconstructed areas that are restricted.

In an example of a third modification, to allow a hardware writing back delay, immediate reconstructed areas cannot be accessed by the IBC mode. The restricted immediate reconstructed area can include 1 to N super blocks where N is a positive integer. In addition to the second modification as described above, if the coordinate of a top-left position of a superblock (1210) under reconstruction is (x0, y0), the prediction at the position (x, y) can be accessed by the IBC mode if the vertical coordinate is less than or equal to y0 and the horizontal coordinate is less than (x0+2(y0−y)−D). D can indicate a size of the immediate reconstructed area(s) that are restricted for the IBC mode. FIG. 12 shows an example of the immediate reconstructed areas that are restricted. Gray-shaded areas include allowed search areas accessible in the IBC mode for respective current superblocks (1210) under reconstruction. Black-shaded areas include disallowed search areas that are not accessible in the IBC mode for the respective current superblocks (1210). White, non-shaded areas include superblocks to be coded (e.g., reconstructed). For the current superblock (1210(1)), the immediate reconstructed areas include two superblocks (1221)-(1222) that are to the left of the current superblock (1210(1)) (e.g., N is 2). D indicates a size of 2 W where W is a width of each superblock. The superblocks (1221)-(1222) are not accessible for the current superblock (1210 (1)). An area (1230) is accessible for the current superblock (1210(1)).

According to an aspect of the disclosure, AV1 can use a local reference range defined in the IBC mode. For example, a portion of on-chip memory (e.g., memory manufactured on a same chip as processors) having a size M×M (e.g., 128×128) can be allocated to store reference samples used in the IBC mode, and the portion of the on-chip memory is referred to as RSM. The RSM can store reconstructed samples that can be used as reference samples. The reconstructed samples stored in the RSM are updated according to an update process, and a range of available reference samples in the RSM can be referred to as local reference range. In an embodiment, the size of the RSM is equal to a size of a superblock. A memory reuse mechanism can be applied to the RSM on a L×L (e.g., 64×64) basis. The RSM can be divided into I RSM units where I is equal to a ratio of M×M over L×L. For example, if M×M is 128×128 and L×L is 64×64, I is 4 (128×128/(64×64)). Some changes can be made to the IBC mode due to the local reference range.

In an example of a first change, the largest block size in the IBC mode is limited to L×L (e.g., 64×64).

In an example of a second change, a reference block and a corresponding current block in a current superblock (SB) can be in a same SB row. In an example, the reference block is only located in the current SB or a left neighboring SB to the left of the current SB.

In an example of a third change, when a unit having the size L×L (e.g., 64×64) of the RSM units begins to update with reconstructed samples of the current SB, previously stored reference samples (e.g., the reference samples of the left neighboring SB) in the entire L×L unit can be marked as unavailable to generate prediction samples used in the IBC mode.

Figure 13:
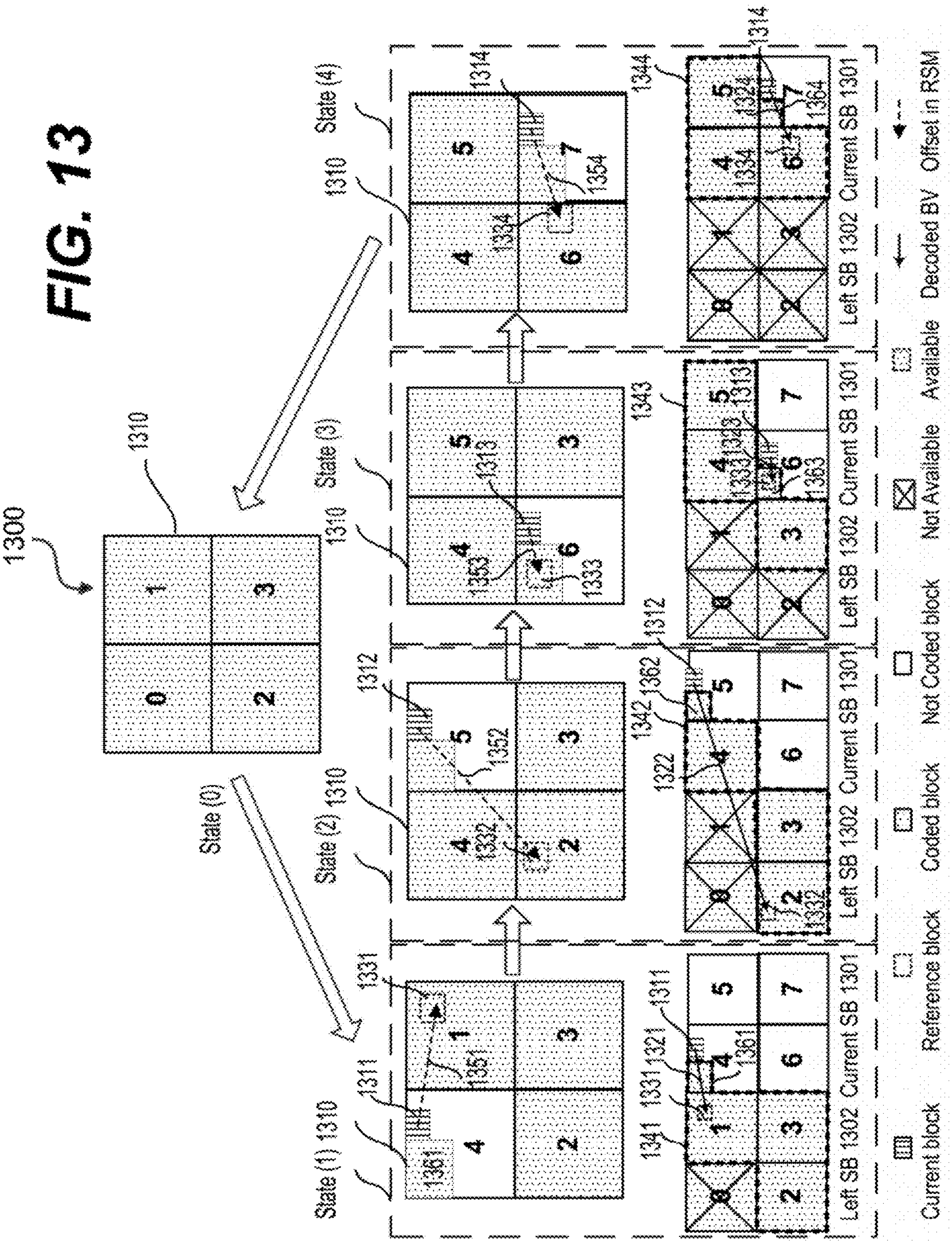
FIG. 13 shows an exemplary memory reuse mechanism.

FIG. 13 shows an exemplary memory reuse mechanism (1300) where a memory (e.g., an RSM (1310)) is updated during coding (e.g., encoding or decoding) of a current SB (1301) in a current picture according to an embodiment of the disclosure. The top block shows the RSM (1310) at a state (0). The top row shows the RSM (1310) at states (1)-(4). A bottom row shows the current SB (1301) that is being coded and a left neighboring SB (1302) in the current picture at the states (0)-(4). The left neighboring SB (1302) can be to the left of the current SB (1301). In an example of FIG. 13, a quad-tree split is used at a SB root and the SB can include four regions. In an example, a size of each of the four regions is 64×64. In an example, the current SB (1301) includes four regions 4-7, and the left neighboring SB (1302) includes four regions 0-3.

At the state (0) that is a beginning of coding each SB, such as the current SB (1301), the RSM (1310) can store samples of a previously coded SB (e.g., the left neighboring SB (1302)). When a current block is located in one of the four regions (e.g., the four 64×64 regions) in the current SB (1301), a corresponding region in the RSM (1310) can be emptied and used to store samples of the current coding region (e.g., the current 64×64 coding region). Samples in the RSM (1310) can be gradually updated by the samples in the current SB (1301).

Referring to the state (1), the current block (1311) is located in the region 4 in the current SB (1301), a corresponding region (e.g., a top-left region) in the RSM (1310) can be emptied and used to store samples of the region 4 that is the current region being coded. Referring to the bottom row, a BV (e.g., an encoded BV or a decoded BV) (1321) can point from the current block (1311) to a reference block (1331) that is within a search range (1341) (boundaries of the search range (1341) are marked by dashed lines) for the current block (1311). Referring to the top row, a corresponding offset (1351) in the RSM (1310) can point from the current block (1311) to the reference block (1331) in the RSM (1310). Referring to the state (1), the search range (1341) includes the regions 1-3 in the left neighboring SB (1302) and coded subregion (1361) in the region 4. The search range (1341) does not include the region 0 in the left neighboring SB (1302).

Referring to the state (2), the current block (1312) is located in the region 5 in the current SB (1301), a corresponding region (e.g., a top-right region) in the RSM (1310) can be emptied and used to store samples of the region 5 that is the current region being coded. A BV (e.g., an encoded BV or a decoded BV) (1322) can point from the current block (1312) to a reference block (1332) that is within a search range (1342) (boundaries of the search range (1342) are marked by dashed lines) for the current block (1312). A corresponding offset (1352) in the RSM (1310) can point from the current block (1312) to the reference block (1332) in the RSM (1310). Referring to the state (2), the search range (1342) includes (i) the regions 2-3 in the left neighboring SB (1302) and (ii) the region 4 and a coded subregion (1362) in the region 5 that are in the current SB (1301). The search range (1342) does not include the regions 0-1 in the left neighboring SB (1302).

Referring to the state (3), the current block (1313) is located in the region 6 in the current SB (1301), a corresponding region (e.g., a bottom-left region) in the RSM (1310) can be emptied and used to store samples of the region 6 that is the current region being coded. A BV (e.g., an encoded BV or a decoded BV) (1323) can point from the current block (1313) to a reference block (1333) that is within a search range (1343) (boundaries of the search range (1343) are marked by dashed lines) for the current block (1313). A corresponding offset (1353) in the RSM (1310) can point from the current block (1313) to the reference block (1333) in the RSM (1310). Referring to the state (3), the search range (1343) includes (i) the region 3 in the left neighboring SB (1302) and (ii) the regions 4-5 and a coded subregion (1363) in the region 6 that are in the current SB (1301). The search range (1343) does not include the regions 0-2 in the left neighboring SB (1302).

Referring to the state (4), the current block (1314) is located in the region 7 in the current SB (1301), a corresponding region (e.g., a bottom-right region) in the RSM (1310) can be emptied and used to store samples of the region 7 that is the current region being coded. A BV (e.g., an encoded BV or a decoded BV) (1324) can point from the current block (1314) to a reference block (1334) that is within a search range (1344) (boundaries of the search range (1344) are marked by dashed lines) for the current block (1314). A corresponding offset (1354) in the RSM (1310) can point from the current block (1314) to the reference block (1334) in the RSM (1310). Referring to the state (4), the search range (1344) includes the regions 4-6 and a coded subregion (1364) in the region 7 that are in the current SB (1301). The search range (1344) does not include the regions 0-3 in the left neighboring SB (1302).

When the current SB (1301) has been coded completely, the entire RSM (1310) can be filled with all the samples of the current SB (1301).

In the example shown in FIG. 13, the current SB (1301) is partitioned using the quad-tree split. A coding order of the four regions in the current SB (1301) can be the top-left region (e.g., the region 4), the top-right region (e.g., the region 5), the bottom-left region (e.g., the region 6), and the bottom-right region (e.g., the region 7). In other block split decisions such as shown in FIGS. 14A-14B, the RSM update process can be similar to that shown in FIG. 13, for example, by replacing the respective regions in the RSM using the reconstructed samples in the current SB.

Figures 14A, 14B:
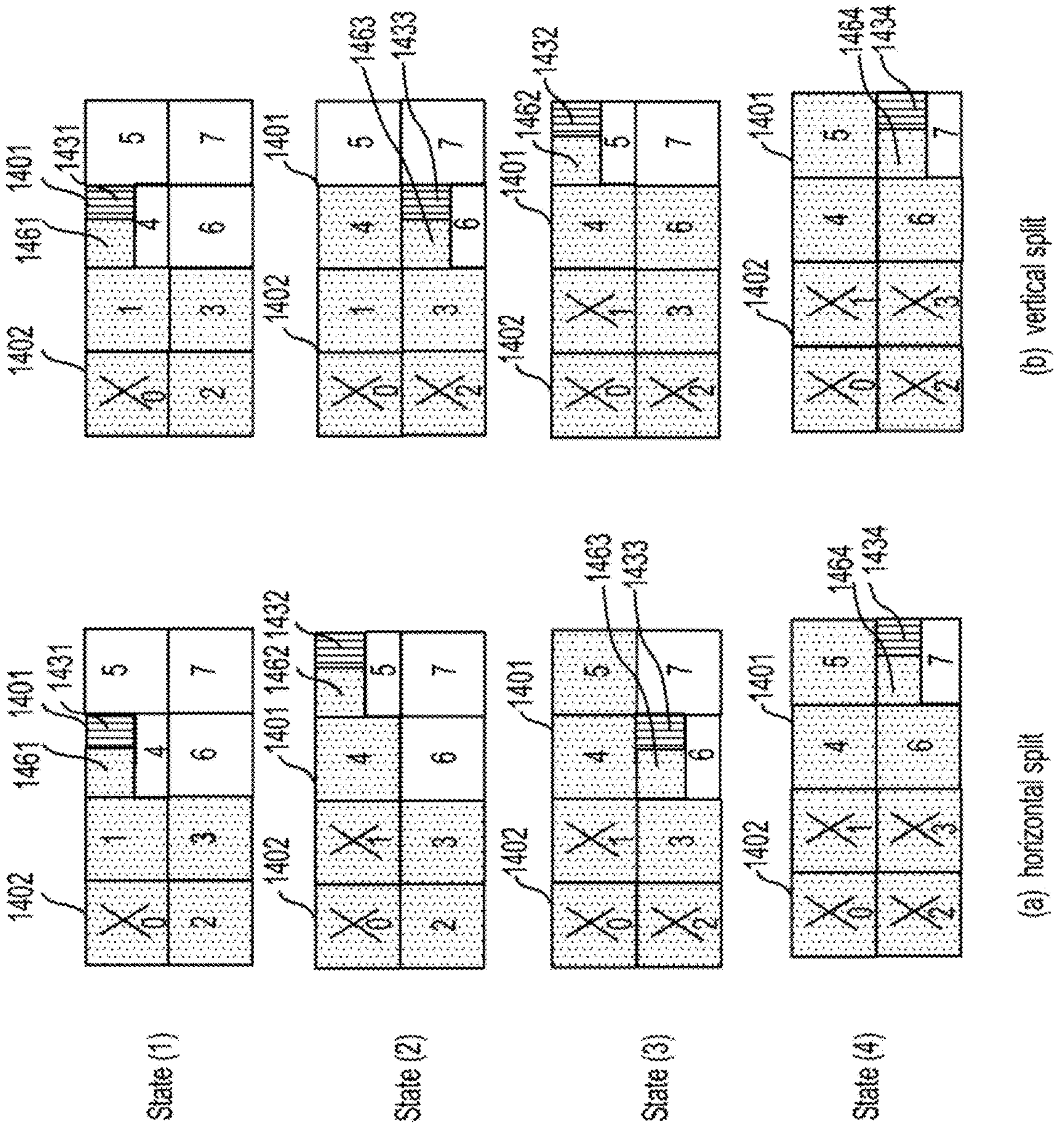
FIGS. 14A-14B show exemplary memory update processes.

FIGS. 14A-14B show exemplary memory update processes in an RSM during coding (e.g., encoding or decoding) of a current SB (1401). In FIGS. 14A-14B, a left neighboring SB (1402) is to the left of the current SB (1401) that is being coded (e.g., encoded or decoded). In an example, a size of each of the current SB (1401) and the left neighboring SB (1402) is 128×128. Each of the current SB (1401) and the left neighboring SB (1402) can include four regions (e.g., four blocks) with a size of 64×64. The current SB (1401) can include the blocks 4-7, and the left neighboring SB (1402) can include the blocks 0-3.

In FIG. 14A, a horizontal split at a SB root is performed and is followed by a vertical split. An SB (e.g., the current SB (1401)) can include four blocks: a top-left block (e.g., the block 4), a bottom-left block (e.g., the block 6), a top-right block (e.g., the block 5), and a bottom-right block (e.g., the block 7). A coding order for the current SB (1401) can be the top-left block (state 1), the top-right block (state 2), the bottom-left block (state 3), and the bottom-right block (state 4).

In FIG. 14B, a vertical split at a SB root is performed and is followed by a horizontal split. A coding order for the current SB (1401) can be the top-left block (state 1), the bottom-left block (state 2), the top-right block (state 3), and the bottom-right block (state 4).

Depending on a location of a current block (e.g., (1431)) relative to the current SB (1401), the following can apply:

(i) Referring to the state (1) in FIGS. 14A-14B, the current block (1431) is in the top-left block (e.g., the block 4) of the current SB (1401), an RSM can include reference samples in the bottom-right block (e.g., the block 3), the bottom-left block (e.g., the block 2), and the top-right block (e.g., the block 1) of the left neighboring SB (1402) in addition to already reconstructed samples in a block (1461) that is in the block 4.

(ii) Referring to the state (2) in FIG. 14A or the state (3) in FIG. 14B, the current block (1432) is in the top-right block (e.g., the block 5) of the current SB (1401).

If a luma sample located at a top-left corner (e.g., (0, 64) relative to the current SB (1401)) of the block 6 has not yet been reconstructed, such as shown at the state (2) in FIG. 14A, in addition to the already reconstructed samples in the block 4 and a block (1462) that is in the block 5, the current block (1432) can refer to the reference samples in the bottom-left block (e.g., the block 2) and the bottom-right block (e.g., the block 3) of the left neighboring SB (1402). The corresponding RSM can include the reference samples in the bottom-left block (e.g., the block 2) and the bottom-right block (e.g., the block 3) of the left neighboring SB (1402) in addition to the block 4 and the block (1462) that is in the block 5.

Otherwise, if the luma sample located at the top-left corner (e.g., (0, 64) relative to the current SB (1401)) of the block 6 has been reconstructed, such as shown at the state (3) in FIG. 14B, the current block (1432) can refer to reference samples in the bottom-right block (e.g., the block 3) of the left neighboring SB (1402). The corresponding RSM can include the reference samples in the bottom-right block (e.g., the block 3) of the left neighboring SB (1402) in addition to the already reconstructed samples in the blocks 4 and 6 and the block (1462) that is in the block 5.

(iii) Referring to the state (3) in FIG. 14A or the state (2) in FIG. 14B, the current block (1433) is in the bottom-left block (e.g., the block 6) of the current SB (1401).

If a luma sample located at a top-left corner of the block 5 (e.g., (64, 0) relative to the current SB (1401)) has not yet been reconstructed, such as shown at the state (2) in FIG. 14B, in addition to the already reconstructed samples in the block 4 and a block (1463) that is in the current SB (1401), the current block (1433) can refer to the reference samples in the top-right block (e.g., the block 1) and the bottom-right block (e.g., the block 3) of the left neighboring SB (1402). The corresponding RSM can include the reference samples in the top-right block (e.g., the block 1) and the bottom-right block (e.g., the block 3) of the left neighboring SB (1402) in addition to the block 4 and the block (1463) that is in the current SB (1401).

Otherwise, if the luma sample located at the top-left corner of the block 5 (e.g., (64, 0) relative to the current SB (1401)) has been reconstructed, such as shown at the state (3) in FIG. 14A, the current block (1433) can refer to reference samples in the bottom-right block (e.g., the block 3) of the left neighboring SB (1402). The corresponding RSM can include the reference samples in the bottom-right block (e.g., the block 3) of the left neighboring SB (1402) in addition to the already reconstructed samples in the blocks 4-5 and the block (1463) that is in the current SB (1401).

(iv) Referring to the state (4) in FIGS. 14A-14B, the current block (1434) is in the bottom-right block (e.g., the block 7) of the current SB (1401). The current block (1434) can refer to the already reconstructed samples in the current SB (1401), such as the already reconstructed samples in the blocks 4-6 and a block (1464). The corresponding RSM can include the reference samples in the blocks 4-6 and the block (1464). In an example, if the current block (1434) falls into the bottom-right block of the current SB (1401), the current block can only refer to the already reconstructed samples in the current SB (1401).

According to an aspect of the disclosure, in some examples (e.g., ECM software), a template matching based prediction technique can be used for intra prediction. The template matching based intra prediction is referred to as intra template matching prediction (IntraTMP). In the IntraTMP mode, a best prediction block for a current block is determined from the reconstructed part of the current picture based on a matching of an L-shaped reference template of the best prediction block to a current template of the current block. In some examples, the encoder searches, in a predefined search range within the reconstructed part of the current frame, for a block with a most similar template to the current template of the current block and uses the block as a prediction block for the current block. The encoder then signals the usage of the IntraTMP mode for the prediction of the current block, and the same prediction operation can be performed at the decoder side.

Figure 15:
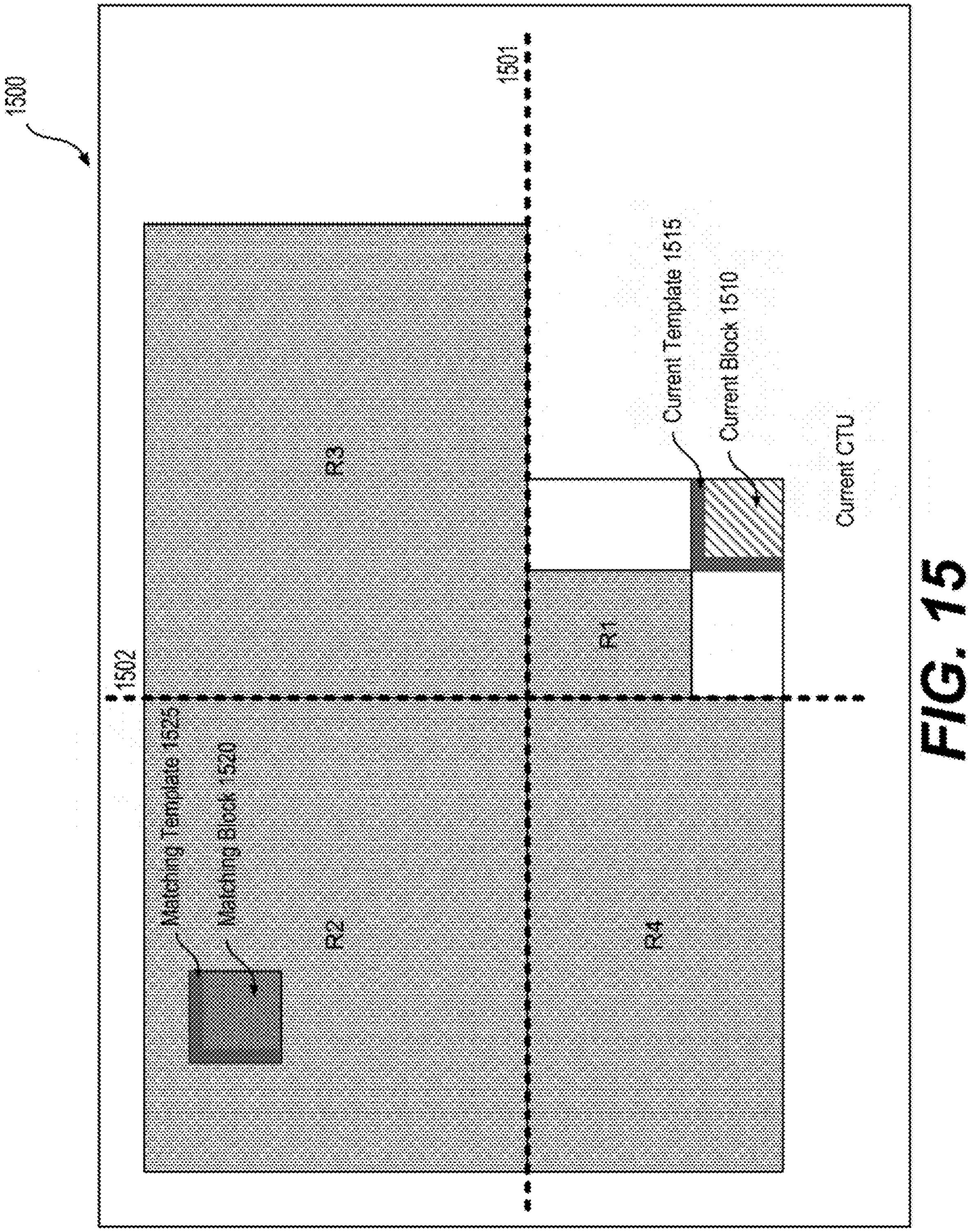
FIG. 15 shows a diagram illustrating a search area for intra template matching prediction in some examples.

FIG. 15 shows a diagram illustrating a search area for intra template matching prediction in some examples. In FIG. 15, a current picture (1500) is partitioned into CTUs, such as shown by horizontal CTU boundaries (15101) and vertical CTU boundaries (1502) in FIG. 15. A current block (1510) is in a current CTU. Neighboring samples of the current block form a current template (1515) that is L-shaped. FIG. 15 shows a predefined search area for intra template matching prediction that includes four regions R1-R4. R1 is within the current CTU, R2 is in the top-left CTU, R3 is in the above CTU, and R4 is in the left CTU.

In an example, within each region, for each potential matching block (1520), an L-shaped neighboring samples of the potential matching block form a potential template (1525) that is L-shaped. A sum of absolute difference (SAD) between the potential template and the current template is calculate as a template matching cost of the potential matching block (1520).

The encoder or decoder can search the predefined regions to determine a matching block with a lowest template matching cost, and the matching block is used as prediction block for the current block (1510).

In some examples, the dimensions of the predefined regions, such as R1-R4 are defined proportional to the dimensions of the current block in order to have a fixed number of comparisons per pixel. In an example, the region R2 can have a size of (SearchRange_w, SearchRange_h), where SearchRange_w is the width of the region R2, and SearchRange_h is the height of the region R2. The current block (1510) can have a size of (BlkW, BlkH), where BlkW is the width of the current block (1510) and BlkH is the height of the current block (1510). The width and the height of the region R2 can be set according to Eq. (3) and Eq. (4):

$$\text{SearchRange}\_w = a \times \text{BlkW} \quad \text{Eq. (3)}$$

$$\text{SearchRange}\_h = a \times \text{BlkH} \quad \text{Eq. (4)}$$

where ‘a’ is a constant that can control the gain/complexity trade-off. In an example, ‘a’ is equal to 5.

In some examples, the IntraTMP tool is enabled for CUs with size less than or equal to 64 in width and height. In some examples, the maximum CU size for IntraTMP is configurable.

In some examples, the IntraTMP mode is signaled at CU level through a dedicated flag when decoder-side intra mode derivation (DEID) is not used for the current CU.

In some related examples (e.g., VVC), when the coding tree type is dual-tree type, IBC is only applied for luma coding blocks, chroma intra coding blocks can only use other intra prediction modes, the coding efficiency of intra chroma coding blocks is limited for chroma separate tree (DUAL_TREE_CHORMA).

It is noted that, in the following description, a template of a block can refer to any suitable portion of neighboring samples of the block, such as the above, left, right and bottom neighboring samples of the block.

Figure 16:
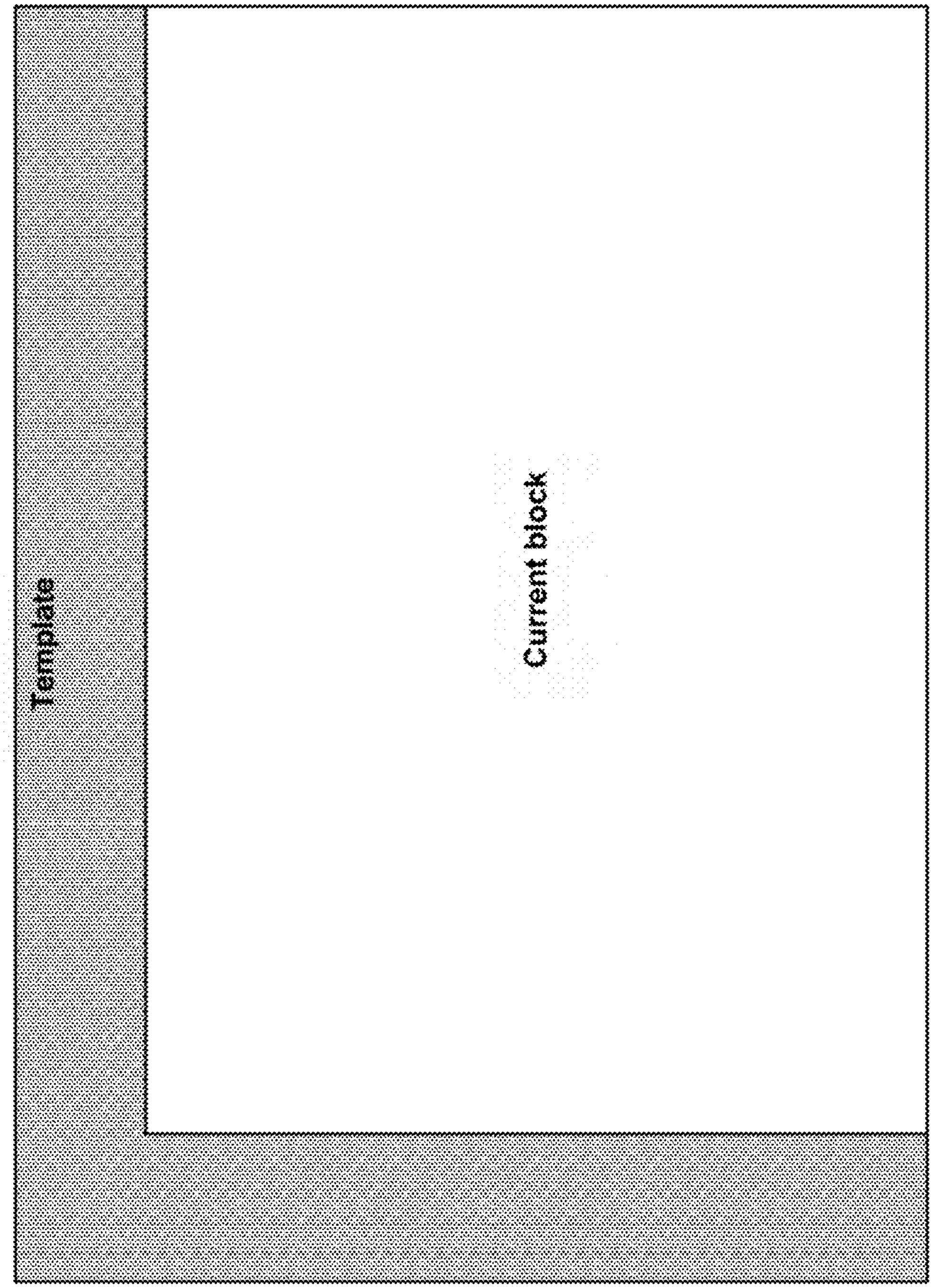
FIG. 16 shows an example of a current block and a template of the current block in an example.

FIG. 16 shows an example of a current block and a template of the current block. The template (shown by the grey area) includes above and left neighboring reconstructed samples. While the template in FIG. 16 is L-shaped, it is noted that a template can be defined to have other suitable pattern.

Aspects of the disclosure provide techniques to enable current picture referencing techniques, such as IBC mode, IntraIBC mode, IntraTMP mode and the like for use on a chroma block (also referred to as chroma coding block in some examples) in chroma separate tree, for example when the coding tree is of dual tree type. The reconstruction of the current chroma block is based on a reference chroma block in the reconstructed portion of the current picture. In some embodiments, a block vector (also referred to as chroma block vector) is determined for the chroma block, and the block vector indicates a reference chroma block in the same picture as the chroma block, and the reference chroma block can be copied to be the current chroma block. The chroma block vector (BV) or a block vector predictor for the chroma BV can be derived from the luma block(s) from the same region (also referred to as corresponding luma area), the luma blocks are from the luma separate tree. The luma block(s) and the chroma block can be referred to as collocated in the same luma area. The chroma block vector or the block vector predictor of the chroma block can be generated by various techniques described in the present disclosure. In some examples, when IntraTMP is used to determine the chroma BV, an initial chroma block vector for the template matching search process can be derived from the luma block(s) collocated with the chroma block in the same luma area.

In some embodiments, the chroma BV of a chroma block is signaled in a similar way as luma BV signaling techniques. In some examples, the chroma BV signaling for a chroma block can include BV predictor (BVP) signaling by a BVP index, BV difference (BVD) signaling, and BV precision index signaling.

In some examples, luma blocks in the corresponding area (same region) as the current chroma block are predicted by applying a current picture reference mode, such as IBC mode, IntraBC mode or IntraTMP mode, the associated luma BV values for the luma blocks are derived. In some examples, the luma BV values of the luma blocks can be used to derive BVP candidates for the chroma block, and one of the BVP candidates can be selected as a BV predictor for the chroma block.

Figure 17:
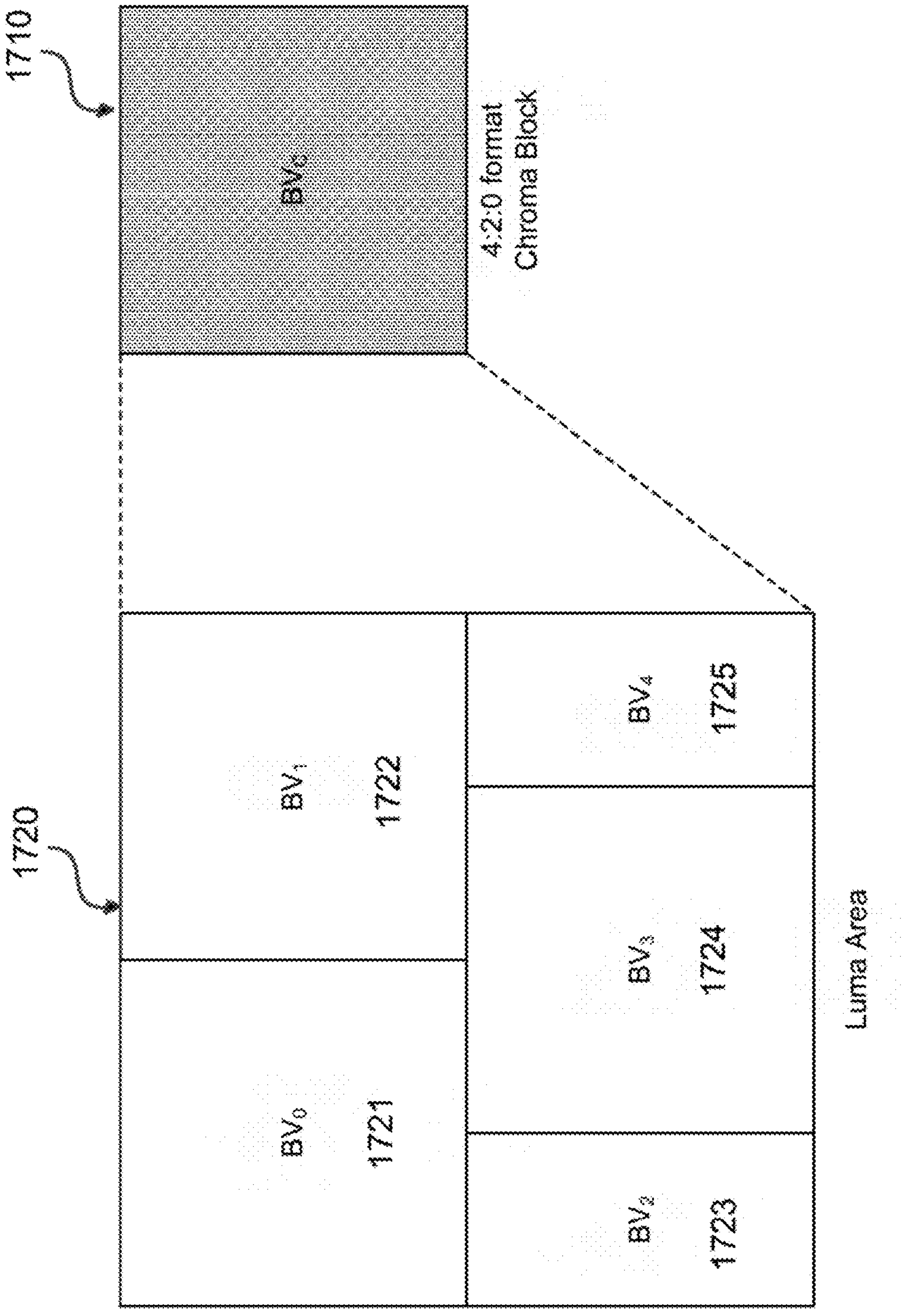
FIG. 17 shows an example of corresponding luma area for a chroma block in an example.

FIG. 17 shows an example of corresponding luma area for a chroma block for a chroma subsampling format 4:2:0. In the FIG. 17, the chroma block (1710) is generated according to the chroma subsampling format 4:2:0. The corresponding luma area (1720) includes one or more luma blocks, such as 5 luma blocks (1721)-(1725). In some examples, the luma blocks (1721)-(1725) can be referred to be collocated luma blocks of the chroma block (1710). The luma blocks (1721)-(1725) can have respective luma BVs, such as shown by $BV_0$, $BV_1$, $BV_2$, $BV_3$ and $BV_4$ in FIG. 17. In some examples, when a luma BV is selected to derive the BV predictor or a BV predictor candidate for the chroma block, the luma BV is suitably converted to a chroma BV for example according to Eq. (1), Eq. (2) and Table 1.

In some examples, a chroma BV predictor candidate is derived from an average value of the luma BVs in the corresponding luma area. For example, in FIG. 17, $BV_c$ denotes chroma BV value for the chroma BV predictor candidate and is derived from an averaging of $BV_0$, $BV_1$, $BV_2$, $BV_3$ and $BV_4$, for example using Eq. (1), Eq. (2) and Table 1.

In some examples, a chroma BV predictor candidate is derived from a luma BV applied at a luma sample position corresponding to a specific position of the chroma block. For example, when the specific position of the chroma block is a center sample position of the chroma block, then the luma BV applied at a luma sample position corresponding to the center sample position of the chroma block is used to derive the chroma BV predictor candidate. In another example, when the specific position of the chroma block is a top-left sample position of the chroma block, then the luma BV applied at a luma sample position corresponding to the top-left sample position of the chroma block is used to derive the chroma BV predictor candidate.

In some examples, a chroma BV predictor candidate is derived from one of the luma BVs in the corresponding luma area. In an example, a chroma BV predictor candidate is derived from $BV_0$. In another example, a chroma BV predictor candidate is derived from $BV_1$. In another example, a chroma BV predictor candidate is derived from $BV_2$. In another example, a chroma BV predictor candidate is derived from $BV_3$. In another example, a chroma BV predictor candidate is derived from $BV_4$.

In some examples, the BV precision for the chroma block may be selected from coarser options than luma BV precisions. In an example, the luma BV precision is 1-pel, and the chroma BV precision can be 2-pel, 4-pel, or 8-pel.

In some examples, chroma BV predictor candidates can be generated according to the above techniques, and put into a candidate list. A BVP index that indicates a selected chroma BV predictor from the chroma BV predictor candidates can be signaled from the encoder side to the decoder side. Further, a BV difference (BVD) may be signaled from the encoder side to the decoder side, and BV precision index may be signaled from the encoder side to the decoder side. In an example, a BV difference value for the chroma block can be determined based the signaled BV difference and the BV precision index. The BV difference value and the selected chroma BV predictor can be combined to determine a final chroma BV that points to a reference chroma block for copying as the current chroma block in an example.

In some embodiments, the chroma BV of a chroma block can be derived from the collocated luma blocks without signaling.

In some examples, the chroma BV of the current chroma block is derived from an average value of the luma BVs in the corresponding luma area. For example, in FIG. 17, $BV_c$ denotes the chroma BV and is derived from an averaging of $BV_0$, $BV_1$, $BV_2$, $BV_3$ and $BV_4$. In an example, the chroma BV is derived from the average according to Eq. (1), Eq. (2) and Table 1. The chroma BV points to a reference chroma block for copying as the current chroma block.

In some examples, the chroma BV of the current chroma block is derived from a luma BV applied at a luma sample position corresponding to a specific position of the chroma block. For example, when the specific position of the chroma block is a center sample position of the chroma block, then the luma BV applied at a luma sample position corresponding to the center sample position of the chroma block is used to derive the chroma BV. In another example, when the specific position of the chroma block is a top-left sample position of the chroma block, then the luma BV applied at a luma sample position corresponding to the top-left sample position of the chroma block is used to derive the chroma BV. The chroma BV points to a reference chroma block for copying as the current chroma block. It is noted that Eq. (1), Eq. (2) and Table 1 are used in the derivation of the chroma block vector in some examples.

In some examples, the chroma BV of the current chroma block is derived from one of the luma BVs in the corresponding luma area. In an example, the chroma BV is derived from $BV_0$. In another example, the chroma BV is derived from $BV_1$. In another example, the chroma BV is derived from $BV_2$. In another example, the chroma BV is derived from $BV_3$. In another example, the chroma BV is derived from $BV_4$. The chroma BV points to a reference chroma block for copying as the current chroma block. It is noted that Eq. (1), Eq. (2) and Table 1 are used in the derivation in some examples.

In an embodiment, an index indicating one of multiple luma BVs in the corresponding luma area may be signaled from the encoder side to the decoder side to indicate which luma BV to be used to derive chroma BV.

In some embodiments, a template-matching based technique is used to determine which luma BV of the multiple luma BVs in the corresponding luma area of the chroma block to be used to derive chroma BV. For example, according to each luma BV of the multiple luma BVs, corresponding candidate chroma BV for the current chroma block is derived. The corresponding candidate chroma BV (of the luma BV) indicates a candidate reference block associated with the luma BV for the current chroma block. By applying the corresponding candidate chroma BV (of a luma BV) to a current template of the current chroma block, a candidate reference template associated with the luma BV is determined. Then, a template matching cost can be calculated between the candidate reference template and the current template of current chroma block, the template matching cost is associated with the candidate chroma BV. The template matching cost is calculated based on a distortion measurement between the current template of current chroma block and the candidate reference template that is associated with the candidate chroma BV, such as based on SAD.

Figure 18:
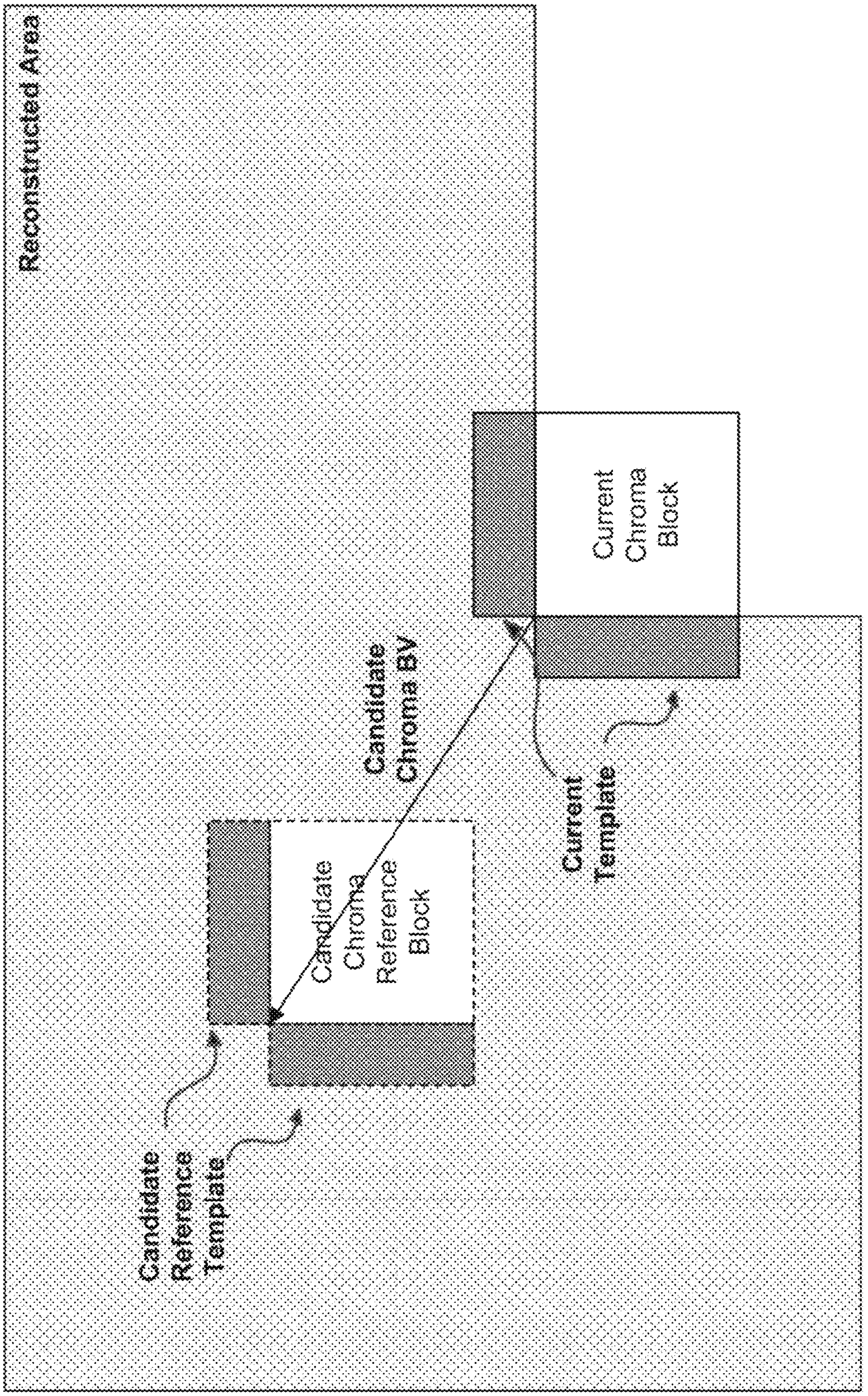
FIG. 18 shows an example of template matching in some examples

FIG. 18 shows an example of template matching in some examples. In an example, a candidate chroma BV is derived according to a luma BV of collocated luma block with a current chroma block (e.g., according to Eq. (1), Eq. (2) and Table 1). The candidate chroma BV (associated with the luma BV) indicates a candidate chroma reference block for the current chroma BV. By applying the candidate chroma BV (associated with the luma BV) to a current template of the current chroma block, a candidate reference template associated with the candidate chroma BV is determined. Then, a template matching cost can be calculated between the candidate reference template and the current template of current chroma block, the template matching cost is associated with the candidate chroma BV. The template matching cost is calculated based on a distortion measurement between the current template of current chroma block and the candidate reference template that is associated with the candidate chroma BV, such as based on SAD.

In some examples, one of the candidate chroma BVs with a minimum template matching cost is used as the chroma BV for the chroma block for prediction in the current picture referencing mode.

In some examples, the candidate chroma BVs are reordered based on the template matching costs into a reordered list having an ascending order for example. In an example, a BV candidate index of the reordered list is signaled from the encoder side to the decoder side to indicate the chroma BV in the reordered list for prediction in the current picture referencing mode.

In some embodiments, the current chroma block can be coded by IntraTMP mode, and the collocated luma block(s) is coded by IntraBC or IntraTMP. In some examples, a chroma BV derived according to a luma BV of a collocated luma block is used as a starting point for the template matching search.

In some examples, for dual tree coding (coding tree type is dual tree type), multiple collocated luma blocks exist in a corresponding luma area for a current chroma block in the IntraTMP mode, the multiple collocated luma blocks can be coded by IntraBC or IntraTMP. In an example, an initial chroma BV derived from a luma BV of a luma block among the multiple collocated luma blocks is used as the starting point for the template matching search to determine a final chroma BV for a prediction of the current chroma block in the current picture referencing. In an example, the luma block among multiple collocated luma blocks is selected according to a predefined order.

In some examples, the current chroma block and its corresponding luma block are used jointly as template for the template matching search. In an example, for the current chroma block, a current chroma template is determined and a current luma template collocated with the current chroma template is determined. During template matching search, for a chroma BV, a corresponding luma BV can be determined for example according to the Eq. (1), Eq. (2) and Table 1. The chroma BV is applied to the current chroma template to determine a chroma reference template. The corresponding luma BV is applied to the current luma template to determine a luma reference template. In some examples, the luma reference template can be determined based on the chroma reference template. For example, the luma reference template includes luma samples that are in the same luma area as the chroma reference template. In an example, a first template matching cost is calculated based on, for example SAD between the current chroma template and the chroma reference template, and a second template matching cost is calculated based on, for example SAD between the current luma template and the luma reference template. The first template matching cost and the second template matching cost are combined to determine a combined template matching cost for the chroma BV in the template matching search. The template matching search can determine a chroma BV with a minimum combined template matching cost in an example.

Figure 19:
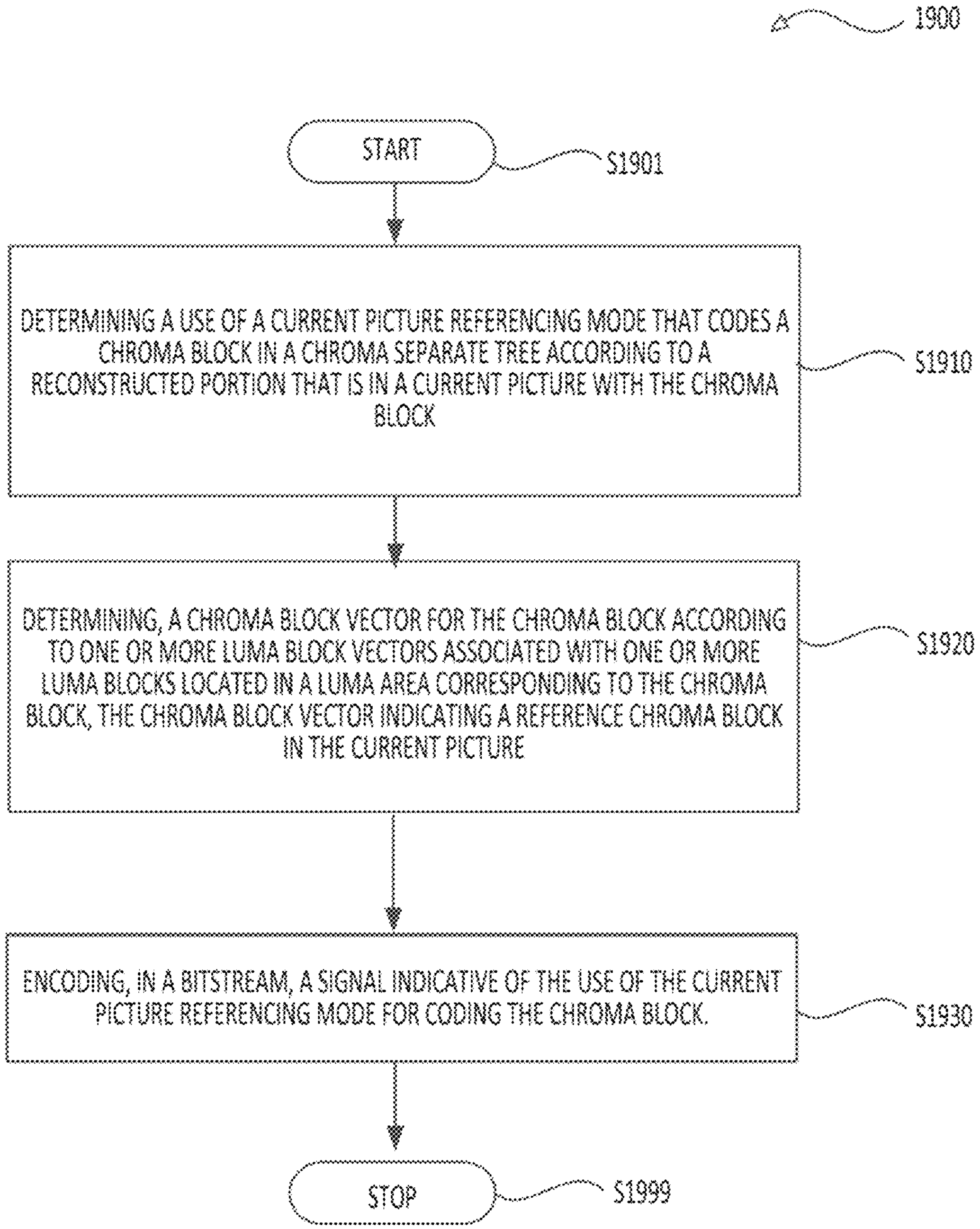
FIG. 19 shows a flow chart outlining a process according to some embodiment of the disclosure.

FIG. 19 shows a flow chart outlining a process (1900) according to an embodiment of the disclosure. The process (1900) can be used in a video encoder. In various embodiments, the process (1900) is executed by processing circuitry, such as the processing circuitry in the terminal devices (310), (320), (330) and (340), the processing circuitry that performs functions of the video encoder (403), the processing circuitry that performs functions of the video encoder (603), the processing circuitry that performs functions of the video encoder (703), and the like. In some embodiments, the process (1900) is implemented in software instructions, thus when the processing circuitry executes the software instructions, the processing circuitry performs the process (1900). The process starts at (S1901) and proceeds to (S1910).

At (S1910), a use of a current picture referencing (CPR) mode on a chroma block in a chroma separate tree is determined. The CPR mode can code the chroma block in the chroma separate tree according to a reconstructed portion that is in a current picture with the chroma block. The CPR mode can be IBC mode, IntraBC mode, IntraTMP mode and the like.

At (S1920), a chroma block vector for the chroma block is determined according to one or more luma block vectors associated with one or more luma blocks located in a luma area corresponding to the chroma block, the chroma block vector indicates a reference chroma block in the current picture.

At (S1930), a signal indicative of the use of the current picture referencing mode for coding the chroma block is encoded in a bitstream for carrying a video.

In some examples, a block vector predictor is derived from a first luma block vector selected from the one or more luma block vectors for predicting the chroma block vector, a block vector difference between the block vector predictor and the chroma block vector is determined. Signals that indicate the first luma block vector and the block vector difference are encoded in the bitstream.

In some examples, the block vector predictor is derived from an average value of the one or more luma block vectors.

In some examples, a first luma block is determined from the one or more luma blocks, the first luma block includes a sample point corresponding to a specific sample position of the chroma block. The block vector predictor is derived from a luma block vector associated with the first luma block. In an example, the specific sample position is a center sample position of the chroma block. In another example, the specific sample position is a top-left sample position of the chroma block.

In some examples, a first precision of the chroma block vector is determined from candidates that are coarser than a second precision of the one or more luma block vectors. A precision index indicative of the first precision is encoded into the bitstream.

In some examples, the chroma block vector is derived from an average value of the one or more luma block vectors.

In some examples, a first luma block is determined from the one or more luma blocks, the first luma block includes a sample point corresponding to a specific sample position of the chroma block. The chroma block vector is derived from a luma block vector associated with the first luma block. In an example, the specific sample position is a center sample position of the chroma block. In another example, the specific sample position is a top-left sample position of the chroma block.

In some examples, the chroma block vector is derived from a first luma block vector from the one or more luma block vectors. An index indicative of the first luma block vector selected from the one or more luma block vectors is encoded in the bitstream.

In some examples, the luma area corresponding to the chroma block includes multiple luma blocks with respective luma block vectors. In some examples, candidate chroma block vectors are derived from the luma block vectors. Candidate reference templates corresponding to a current template of the chroma block are respectively determined according to the candidate chroma block vectors. Template matching costs respectively associated with the candidate chroma block vectors are calculated according to distortions between the current template and the candidate reference templates. The chroma block vector is selected from the candidate chroma block vectors based on the template matching costs. For example, the chroma block vector has a minimum template matching cost among the candidate chroma block vectors.

In some examples, the candidate chroma block vectors are ordered into a reordered list of candidate chroma block vectors according to the template matching costs. The chroma block vector is selected from the reordered list according to other suitable techniques, such as rate distortion measure. An index indicative of the chroma block vector selected from the reordered list of candidate chroma block vectors is encoded in the bitstream.

In some examples, an initial chroma block vector is derived according to the one or more luma block vectors. A template matching search is performed starting from the initial chroma block vector to determine the chroma block vector.

In some examples, the initial chroma block vector is derived from an average value of the one or more luma block vectors.

In some examples, a first luma block is determined from the one or more luma blocks, the first luma block includes a sample point corresponding to a specific sample position of the chroma block. The initial chroma block vector is derived from a luma block vector associated with the first luma block. In an example, the specific sample position is a center sample position of the chroma block. In another example, the specific sample position is a top-left sample position of the chroma block.

In some examples, a first luma block vector is selected from the one or more luma block vectors for deriving the initial chroma block. An index indictive of the first luma block vector selected from the one or more luma block vectors is encoded in the bitstream.

In some examples, to performing the template matching search, the chroma block and corresponding luma block are used jointly as template for the template matching search. For example, for an intermediate chroma block vector, an intermediate chroma reference template corresponding to a current chroma template of the chroma block is determined according to the intermediate chroma block vector. Then, an intermediate luma reference template collocated with the intermediate chroma reference template is determined. A first template matching cost is calculated according to distortions between the current chroma template and the intermediate chroma reference template, and a second template matching cost is calculated according to distortions between a current luma template collocated with the current chroma template and the intermediate luma reference template. A combined template matching cost associated with the intermediate chroma block vector is calculated by combining the first template matching cost with the second template matching cost. The combined template matching cost is used as the cost measure of the intermediate chroma block vector.

Then, the process proceeds to (S1999) and terminates.

The process (1900) can be suitably adapted. Step(s) in the process (1900) can be modified and/or omitted. Additional step(s) can be added. Any suitable order of implementation can be used.

Figure 20:
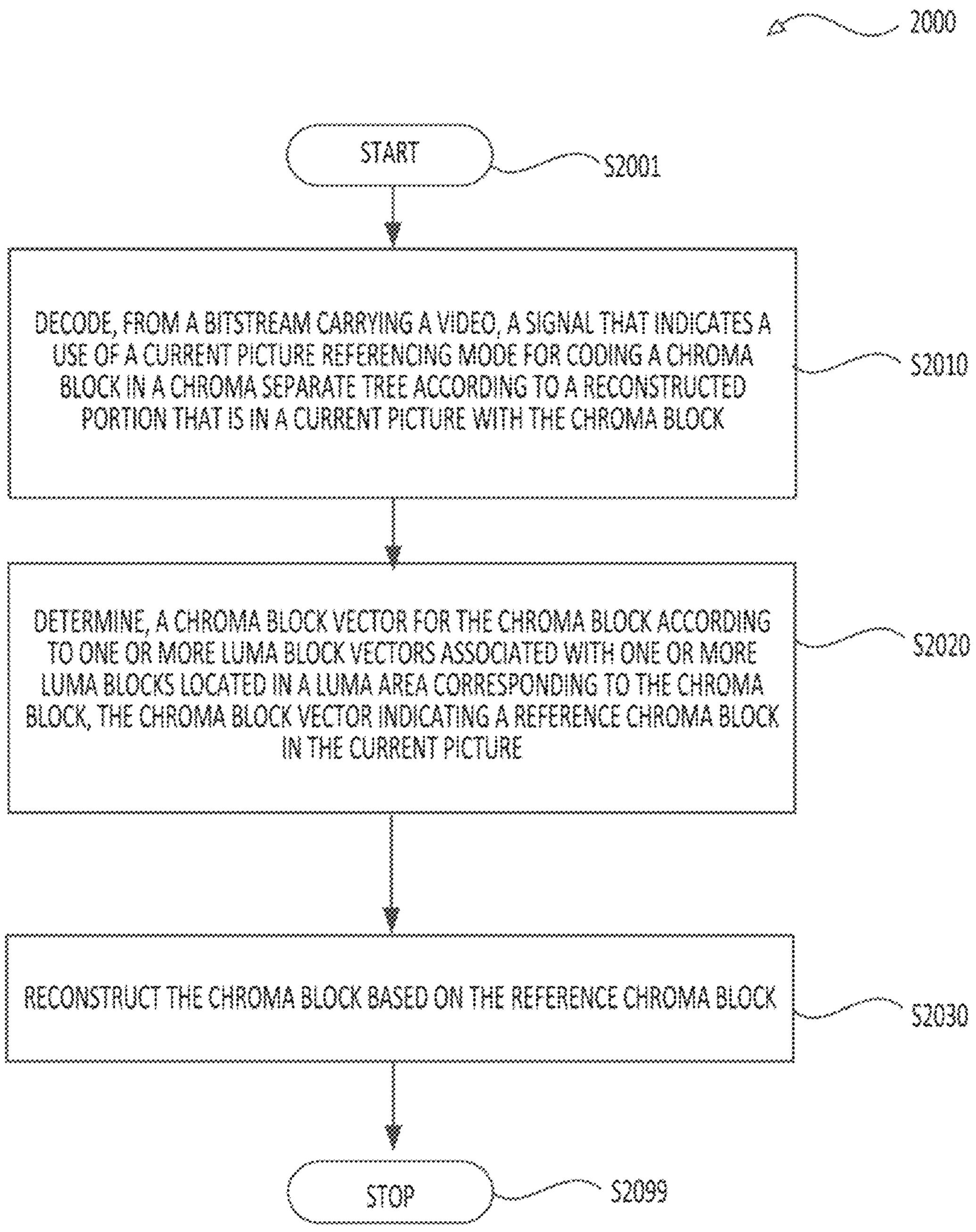
FIG. 20 shows a flow chart outlining another process according to some embodiment of the disclosure.

FIG. 20 shows a flow chart outlining a process (2000) according to an embodiment of the disclosure. The process (2000) can be used in a video decoder. In various embodiments, the process (2000) is executed by processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (2000) is implemented in software instructions, thus when the processing circuitry executes the software instructions, the processing circuitry performs the process (2000). The process starts at (S2001) and proceeds to (S2010).

At (S2010), from a bitstream (also referred to as coded video bitstream) carrying a video, a signal (also referred to as syntax element) is decoded, and the signal indicates a use of a current picture referencing (CPR) mode for coding a chroma block in a chroma separate tree according to a reconstructed portion that is in a current picture with the chroma block. In some examples, a coded video bitstream including a current picture is received. The current picture includes a chroma block in a chroma separate tree, the chroma block is collocated in a same luma area with one or more luma blocks. From the coded video bitstream, a syntax element that indicates a use of a current picture referencing (CPR) mode for the chroma block is decoded. The CPR mode can be IBC mode, IntraBC mode, IntraTMP mode and the like.

At (S2020), a chroma block vector for the chroma block is determined according to one or more luma block vectors associated with one or more luma blocks, the one or more luma blocks are located in a luma area corresponding to the chroma block (e.g., collocated with the chroma block), the chroma block vector indicates a reference chroma block in the current picture.

At (S2030), the chroma block is reconstructed based on the reference chroma block.

In some embodiments, a block vector predictor is determined according to the one or more luma block vectors, a block vector difference is decoded from the bitstream. The chroma block vector is determined based on the block vector predictor and the block vector difference. In some examples, the block vector predictor is derived from an average value of the one or more luma block vectors, such as using Eq. (1), Eq. (2) and Table 1.

In some examples, a first luma block is determined from the one or more luma blocks, the first luma block includes a sample point corresponding to a specific sample position of the chroma block. The block vector predictor is derived from a luma block vector associated with the first luma block. In an example, the specific sample position is a center sample position of the chroma block. In another example, the specific sample position is a top-left sample position of the chroma block.

In some examples, an index indicative of a first luma block vector from the one or more luma block vectors is decoded from the bitstream. The block vector predictor is derived from the first luma block vector.

In some examples, a first precision of the chroma block vector is determined from candidates that are coarser than a second precision of the one or more luma block vectors, for example based on a precision index decoded from the bitstream.

In some examples, the chroma block vector is derived from an average value of the one or more luma block vectors, such as using Eq. (1), Eq. (2) and Table 1.

In some examples, a first luma block is determined from the one or more luma blocks, the first luma block includes a sample point corresponding to a specific sample position of the chroma block. The chroma block vector is derived from a luma block vector associated with the first luma block. In an example, the specific sample position is a center sample position of the chroma block. In another example, the specific sample position is a top-left sample position of the chroma block.

In some examples, an index indicative of a first luma block vector from the one or more luma block vectors is decoded from the bitstream. The chroma block vector is derived from the first luma block vector.

In some examples, the luma area corresponding to the chroma block includes multiple luma blocks with respective luma block vectors. Candidate chroma block vectors are derived respectively from the luma block vectors. Candidate reference templates corresponding to a current template of the chroma block are determined according to the candidate chroma block vectors. Template matching costs respectively associated with the candidate chroma block vectors are calculated according to distortions between the current template and the candidate reference templates, such as using SAD. The chroma block vector is selected from the candidate chroma block vectors based on the template matching costs, for example the chroma block vector has a minimum template matching cost among the candidate chroma block vectors.

In some examples, the candidate chroma block vectors are ordered into a reordered list of candidate chroma block vectors according to the template matching costs. Then, an index indicative of the chroma block vector from the reordered list of candidate chroma block vectors is decoded from the bitstream. The chroma block vector is selected from the reordered list according to the index.

In some embodiments, an initial chroma block vector is determined according to the one or more luma block vectors. A template matching search is performed starting from the initial chroma block vector to determine the chroma block vector. In some examples, the initial chroma block vector is derived from an average value of the one or more luma block vectors, such as using Eq. (1), Eq. (2) and Table 1.

In some examples, a first luma block is determined from the one or more luma blocks, the first luma block includes a sample point corresponding to a specific sample position of the chroma block. The initial chroma block vector is derived from a luma block vector associated with the first luma block. In an example, the specific sample position is a center sample position of the chroma block. In another example, the specific sample position is a top-left sample position of the chroma block.

In some examples, an index indicative of a first luma block vector from the one or more luma block vectors is decoded from the bitstream. The initial chroma block vector is derived from the first luma block vector.

In some examples, to performing the template matching search, the chroma block and corresponding luma block are used jointly as template for the template matching search. For example, for an intermediate chroma block vector, an intermediate chroma reference template corresponding to a current chroma template of the chroma block is determined according to the intermediate chroma block vector. Then, an intermediate luma reference template collocated (e.g., in a same luma area) with the intermediate chroma reference template is determined. A first template matching cost is calculated according to distortions between the current chroma template and the intermediate chroma reference template, and a second template matching cost is calculated according to distortions between a current luma template collocated with the current chroma template and the intermediate luma reference template. A combined template matching cost associated with the intermediate chroma block vector is calculated by combining the first template matching cost with the second template matching cost. The combined template matching cost is used as the cost measure of the intermediate chroma block vector.

Then, the process proceeds to (52099) and terminates.

The process (2000) can be suitably adapted. Step(s) in the process (2000) can be modified and/or omitted. Additional step(s) can be added. Any suitable order of implementation can be used.

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
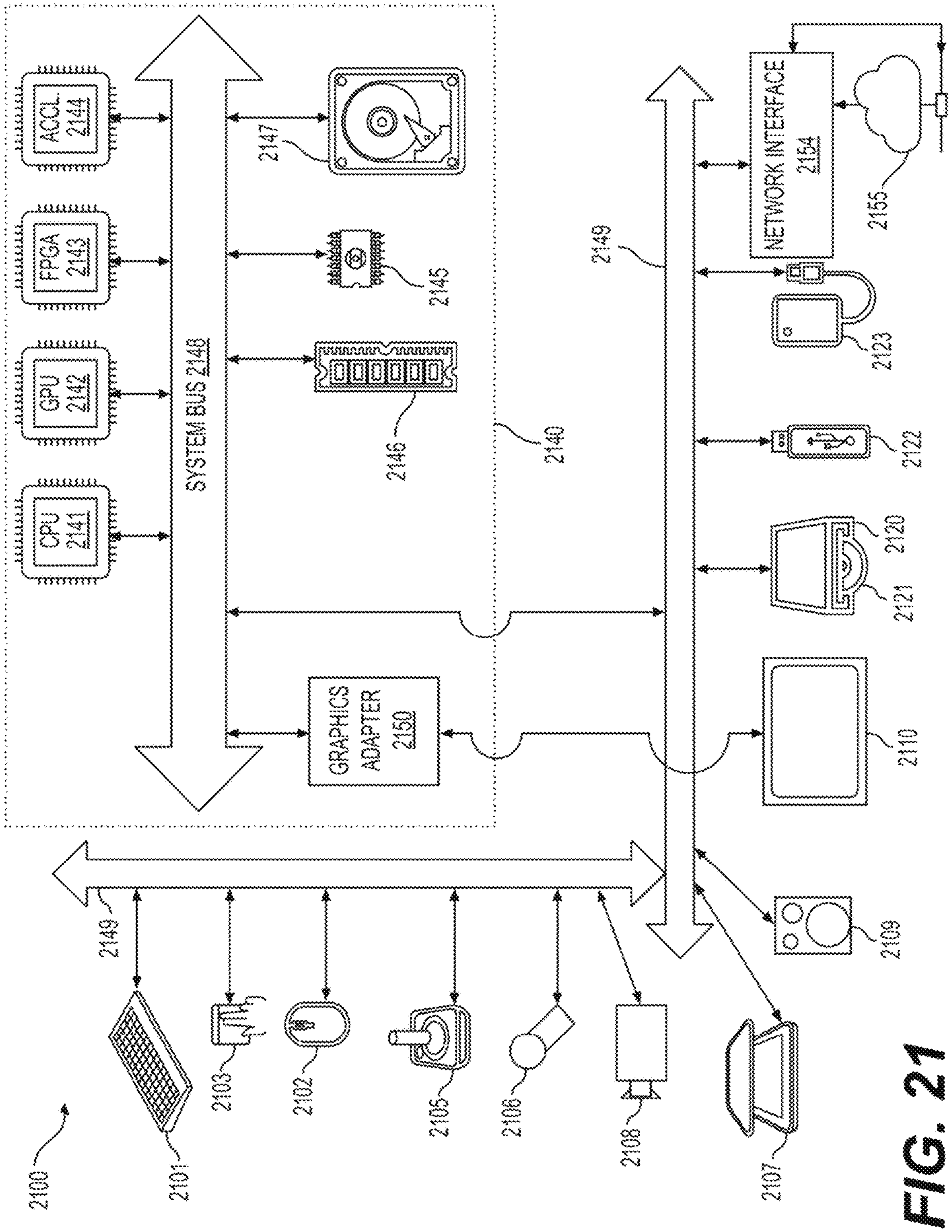
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on.

Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), graphics adapters (2150), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video processing in a decoder, comprising:

receiving a coded video bitstream comprising a current picture, the current picture including a chroma block in a chroma separate tree, the chroma block being collocated in a same luma area with luma blocks associated with respective luma block vectors;

decoding, from the coded video bitstream, a syntax element that indicates one of an intra template matching prediction (IntraTMP) mode and an intra block copy (IBC) mode for the chroma block;

deriving candidate chroma block vectors from the luma block vectors, the deriving including:

deriving an initial chroma block vector according to the luma block vectors; and performing a first template matching process including performing a template matching search starting from the initial chroma block vector to determine one of the candidate chroma block vectors;

performing a second template matching process including:

determining candidate reference templates corresponding to a current template of the chroma block according to the candidate chroma block vectors derived from the luma block vectors;

calculating template matching costs respectively associated with the candidate chroma block vectors according to distortions between the current template and the candidate reference templates; and ordering the candidate chroma block vectors into a reordered list of the candidate chroma block vectors according to the template matching costs;

decoding, from the coded video bitstream, an index indicative of a chroma block vector from the reordered list of the candidate chroma block vectors;

selecting the chroma block vector from the reordered list according to the index; and reconstructing, using the one of the IntraTMP mode and the IBC mode, the chroma block based on the selected chroma block vector.

2. The method of claim 1, wherein the method further comprises:

determining a block vector predictor according to the luma block vectors;

decoding, from the coded video bitstream, a block vector difference; and determining another one of the candidate chroma block vectors based on the block vector predictor and the block vector difference.

3. The method of claim 2, wherein the determining the block vector predictor further comprises:

determining a first luma block from the luma blocks, the first luma block comprising a sample point corresponding to a center sample position of the chroma block; and deriving the block vector predictor from a luma block vector associated with the first luma block.

4. The method of claim 2, wherein the determining the block vector predictor further comprises:

determining a first luma block from the luma blocks, the first luma block comprising a sample point corresponding to a top-left sample position of the chroma block; and deriving the block vector predictor from a luma block vector associated with the first luma block.

5. The method of claim 2, wherein the determining the block vector predictor further comprises:

decoding an index indicative of a first luma block vector from the luma block vectors; and deriving the block vector predictor from the first luma block vector.

6. The method of claim 2, further comprising:

determining a first precision of the chroma block vector from precision candidates that are coarser than a second precision of the luma block vectors.

7. The method of claim 1, wherein the method further comprises:

determining a first luma block from the luma blocks, the first luma block comprising a sample point corresponding to a center sample position of the chroma block; and deriving another one of the candidate chroma block vectors from a luma block vector associated with the first luma block.

8. The method of claim 1, wherein the method further comprises:

determining a first luma block from the luma blocks, the first luma block comprising a sample point corresponding to a top-left sample position of the chroma block; and deriving another one of the candidate chroma block vectors from a luma block vector associated with the first luma block.

9. The method of claim 1, wherein the method further comprises:

decoding an index indicative of a first luma block vector from the luma blocks; and deriving another one of the candidate chroma block vectors from the first luma block vector.

10. The method of claim 1, wherein the deriving the initial chroma block vector further comprises:

determining a first luma block from the luma blocks, the first luma block comprising a sample point corresponding to a center sample position of the chroma block; and deriving the initial chroma block vector based on a luma block vector associated with the first luma block.

11. The method of claim 1, wherein the deriving the initial chroma block vector further comprises:

determining a first luma block from the luma blocks, the first luma block comprising a sample point corresponding to a top-left sample position of the chroma block; and deriving the initial chroma block vector based on a luma block vector associated with the first luma block.

12. The method of claim 1, wherein the deriving the initial chroma block vector further comprises:

decoding an index indicative of a first luma block vector from the luma block vectors; and deriving the initial chroma block vector based on the first luma block vector.

13. The method of claim 1, wherein the performing the template matching search further comprises, for an intermediate chroma block vector:

determining an intermediate chroma reference template corresponding to a current chroma template of the chroma block according to the intermediate chroma block vector;

determining an intermediate luma reference template collocated with the intermediate chroma reference template;

calculating a first template matching cost according to a distortion between the current chroma template and the intermediate chroma reference template;

calculating a second template matching cost according to a distortion between a current luma template collocated with the current chroma template and the intermediate luma reference template; and calculating a combined template matching cost associated with the intermediate chroma block vector by combining the first template matching cost with the second template matching cost.

14. The method of claim 1, wherein the reconstructing comprises:

when the syntax element indicates the IBC mode for the chroma block, reconstructing the chroma block based on a reference chroma block in the current picture, the selected chroma block vector indicating the reference chroma block; and when the syntax element indicates the IntraTMP mode for the chroma block, performing a third template matching process including a template matching search starting from the selected chroma block vector to determine a final chroma block vector; and reconstructing the chroma block based on a reference chroma block in the current picture, the final chroma block vector indicating the reference chroma block.

15. A method of video processing in an encoder, comprising:

deriving candidate chroma block vectors from luma block vectors associated with respective luma blocks, the deriving including:

deriving an initial chroma block vector according to the luma block vectors; and performing a first template matching process including a template matching search starting from the initial chroma block vector to determine one of the candidate chroma block vectors;

performing a second template matching process including:

determining candidate reference templates corresponding to a current template of a chroma block in a current picture according to the candidate chroma block vectors derived from the luma block vectors, the chroma block being coded using one of an intra template matching prediction (IntraTMP) mode and an intra block copy (IBC) mode, the chroma block being in a chroma separate tree and being collocated in a same luma area with the luma blocks;

calculating template matching costs respectively associated with the candidate chroma block vectors according to distortions between the current template and the candidate reference templates; and ordering the candidate chroma block vectors into a reordered list of the candidate chroma block vectors according to the template matching costs;

encoding a syntax element in a video bitstream, the syntax element indicating that the one of the IntraTMP mode and the IBC mode is applied to the chroma block;

encoding, using the one of the IntraTMP mode and the IBC mode, the chroma block based on a chroma block vector from the reordered list of the candidate chroma block vectors; and encoding, in the video bitstream, an index indicative of the chroma block vector from the reordered list of the candidate chroma block vectors.

16. The method of claim 15, wherein the method further comprises:

selecting the chroma block vector from the candidate chroma block vectors based on the template matching costs, the chroma block vector having a minimum template matching cost among the candidate chroma block vectors.

17. The method of claim 15, wherein the encoding the chroma block comprises:

when the one of the IntraTMP mode and the IBC mode is the IBC mode, encoding the chroma block based on a reference chroma block in the current picture, the chroma block vector indicating the reference chroma block; and when the one of the IntraTMP mode and the IBC mode is the IntraTMP mode, performing a third template matching process including a template matching search starting from the chroma block vector to determine a final chroma block vector; and encoding the chroma block based on a reference chroma block in the current picture, the final chroma block vector indicating the reference chroma block.

18. A non-transitory computer-readable storage medium storing instructions which when executed by a processor cause the processor to perform a method of encoding a video bitstream comprising:

deriving candidate chroma block vectors from luma block vectors associated with respective luma blocks, the deriving including:

deriving an initial chroma block vector according to the luma block vectors; and performing a first template matching process including a template matching search starting from the initial chroma block vector to determine one of the candidate chroma block vectors;

performing a second template matching process including:

determining candidate reference templates corresponding to a current template of a chroma block in a current picture according to the candidate chroma block vectors derived from the luma block vectors, the chroma block being coded using one of an intra template matching prediction (IntraTMP) mode and an intra block copy (IBC) mode, the chroma block being in a chroma separate tree and being collocated in a same luma area with the luma blocks;

calculating template matching costs respectively associated with the candidate chroma block vectors according to distortions between the current template and the candidate reference templates; and ordering the candidate chroma block vectors into a reordered list of the candidate chroma block vectors according to the template matching costs;

encoding a syntax element in the video bitstream, the syntax element indicating that the one of the IntraTMP mode and the IBC mode is applied to the chroma block;

encoding, using the one of the IntraTMP mode and the IBC mode, the chroma block based on a chroma block vector from the reordered list of the candidate chroma block vectors;

encoding, in the video bitstream, an index indicative of the chroma block vector from the reordered list of the candidate chroma block vectors; and transmitting the video bitstream including the syntax element and the index.

19. The method of claim 18, wherein the encoding the chroma block comprises:

when the one of the IntraTMP mode and the IBC mode is the IBC mode, encoding the chroma block based on a reference chroma block in the current picture, the chroma block vector indicating the reference chroma block; and when the one of the IntraTMP mode and the IBC mode is the IntraTMP mode, performing a third template matching process including a template matching search starting from the chroma block vector to determine a final chroma block vector; and encoding the chroma block based on a reference chroma block in the current picture, the final chroma block vector indicating the reference chroma block.

* * * * *